Figure 1:
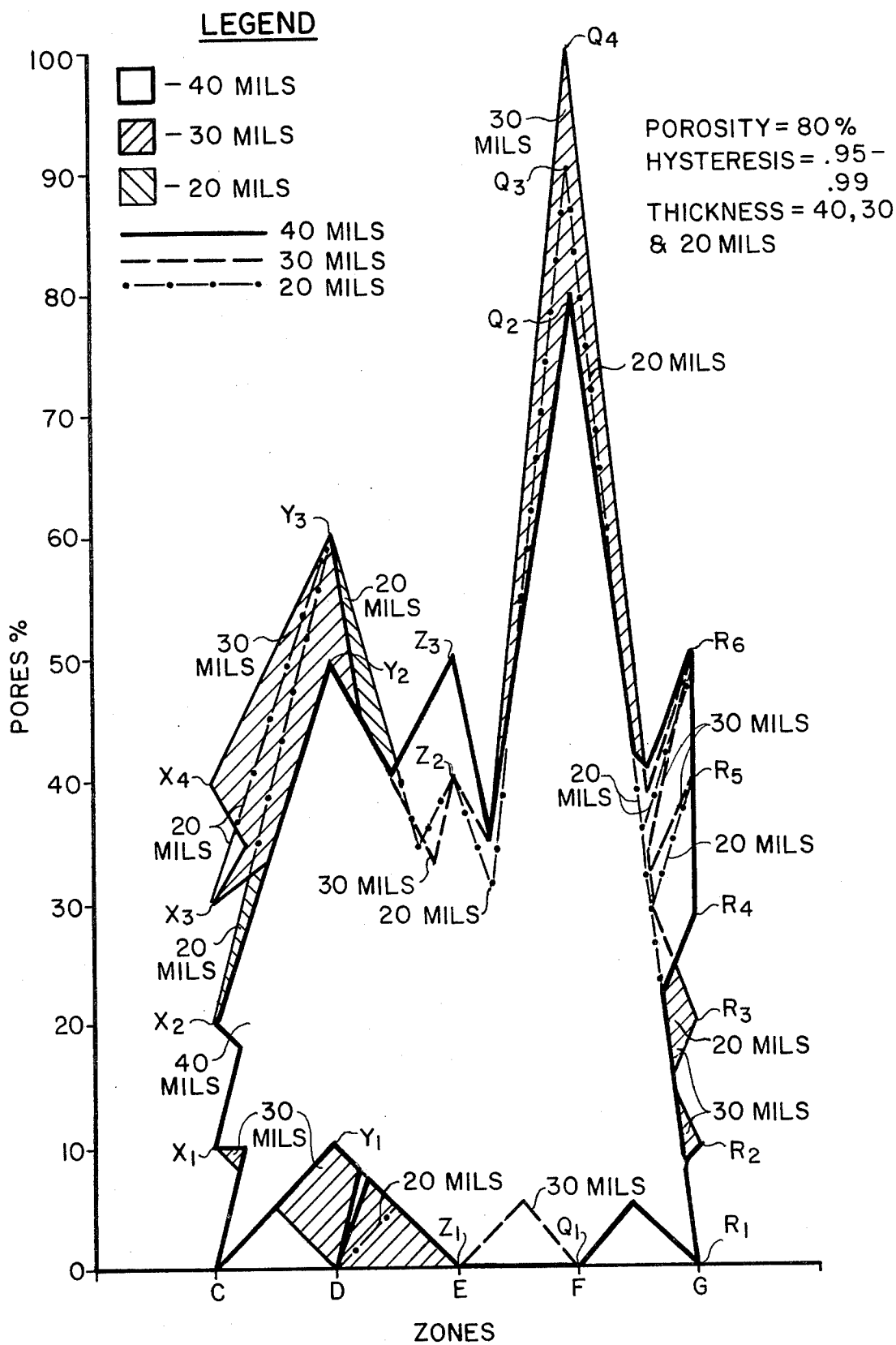
Figure 2:
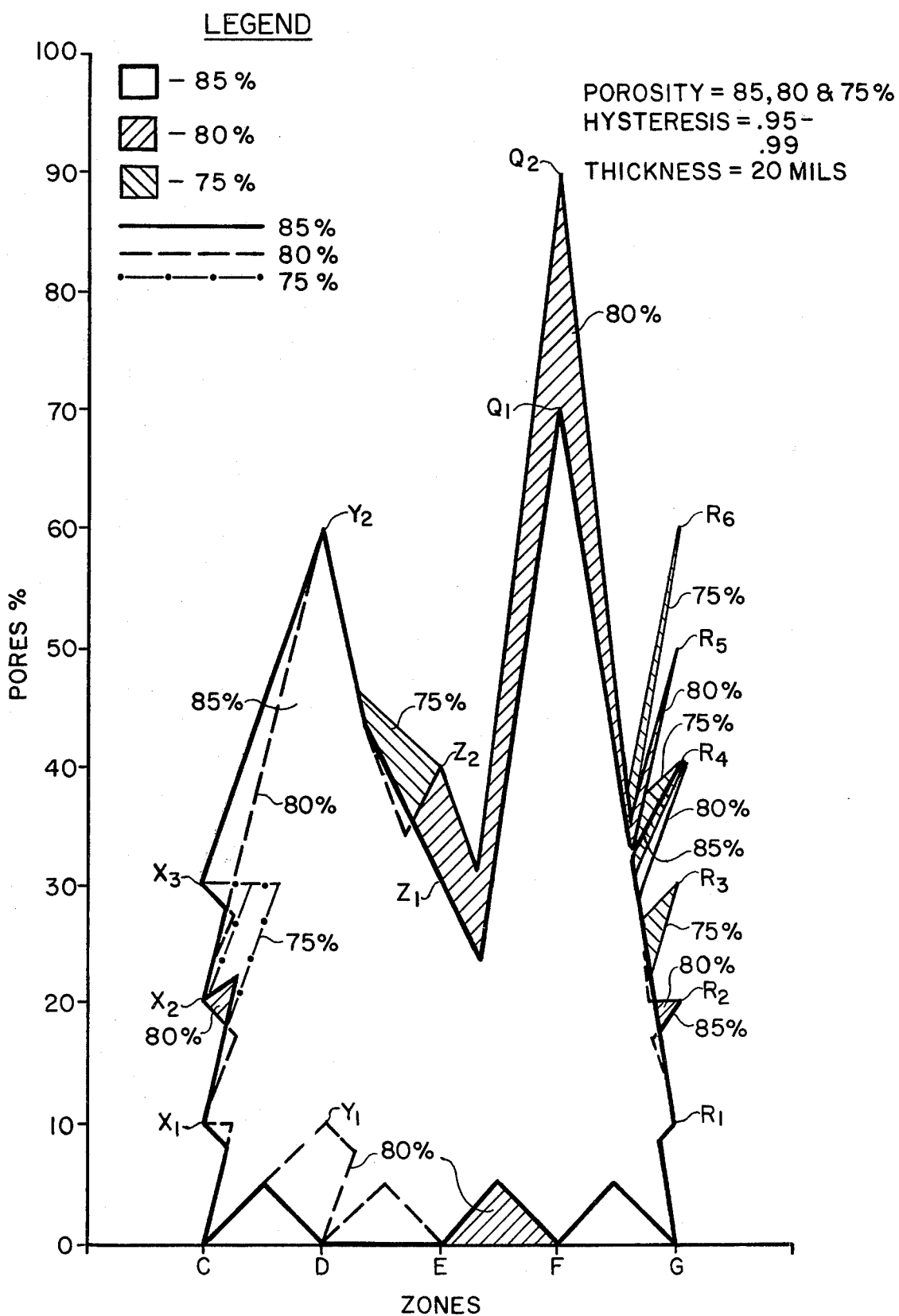
Figure 3:
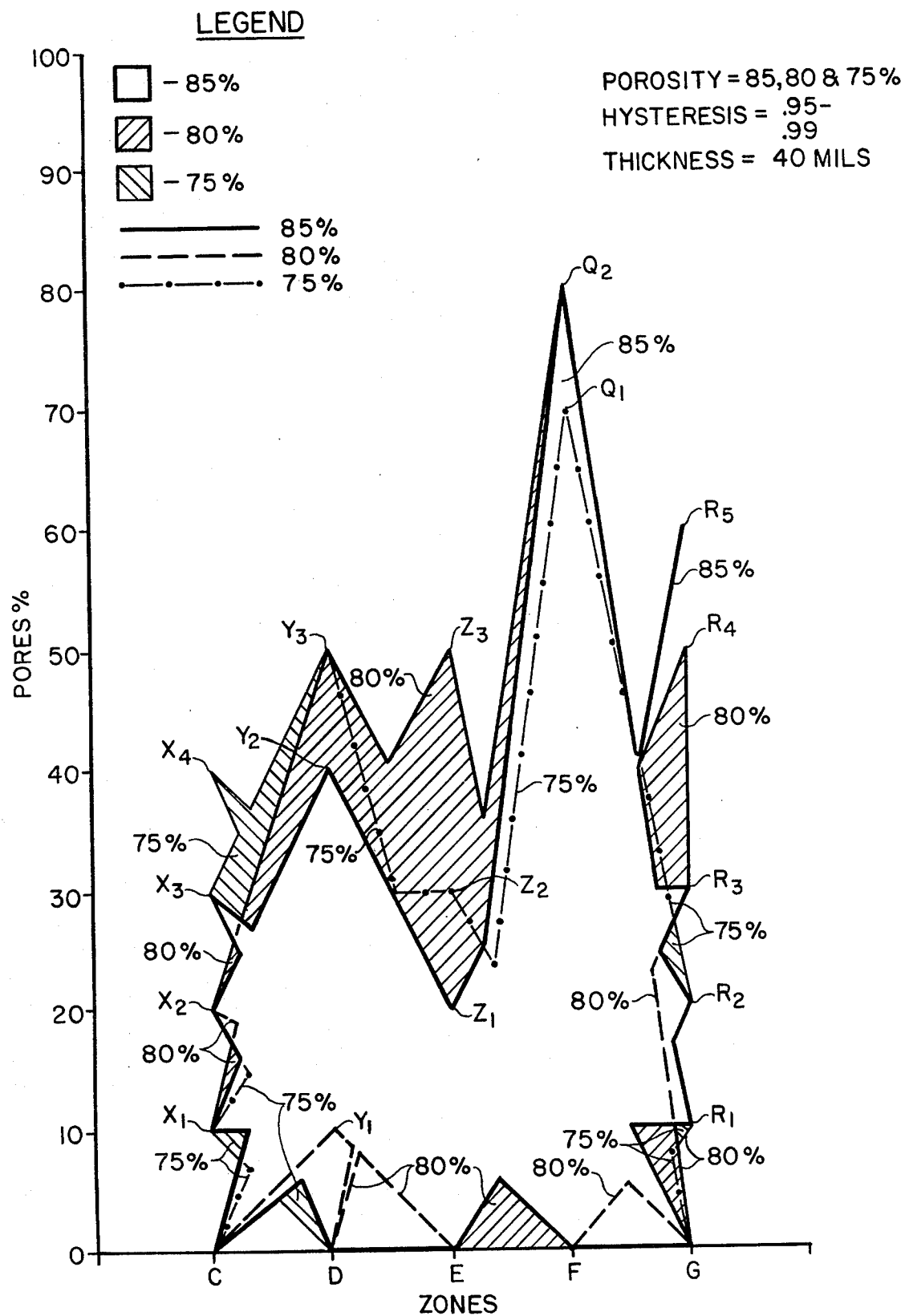
Figure 4:
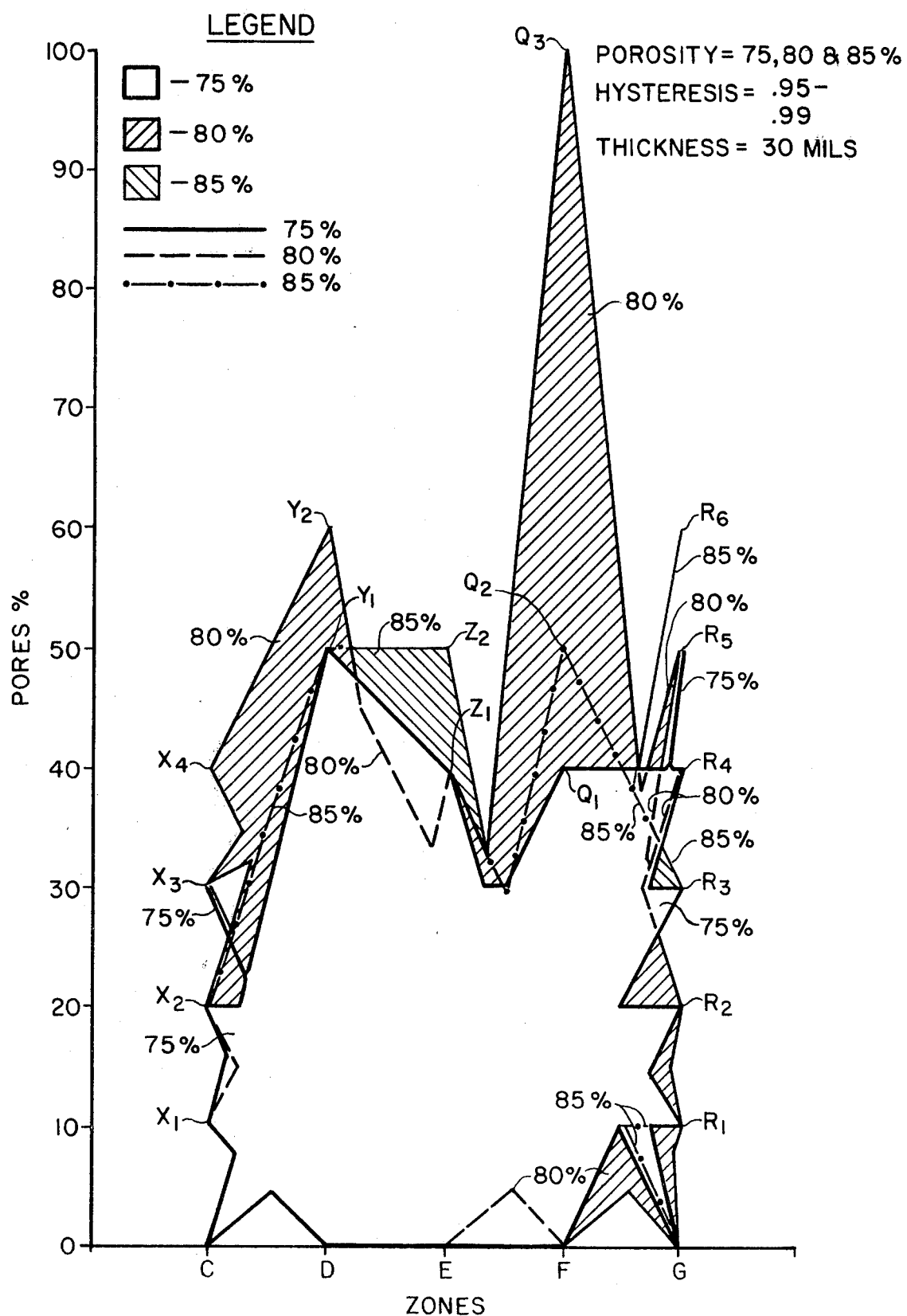

United States Patent [19]

Lazarz et al.

[11] 4,250,002
[45] Feb. 10, 1981

[54] POLYMERIC MICROPOROUS SEPARATORS FOR USE IN ELECTROLYTIC PROCESSES AND DEVICES

[75] Inventors: Christine A. Lazarz; Edward H. Cook, Jr., both of Niagara Falls; Arthur C. Schulz, North Tonawanda, all of N.Y.

[73] Assignee: Hooker Chemicals & Plastics Corp., Niagara Falls, N.Y.

[21] Appl. No.: 76,884

[22] Filed: Sep. 19, 1979

Related U.S. Application Data

[63] Continuation-in-part of Ser. No. 957,515, Nov. 3, 1978, abandoned.

[51] Int. Cl.³ .................. C25B 1/34; C25B 13/02; C25B 13/08
[52] U.S. Cl. .................. 204/98; 204/128; 204/296
[58] Field of Search .................. 204/296, 98, 128

[56] References Cited

U.S. PATENT DOCUMENTS

| | | | |
|---|---|---|---|
| 2,573,639 | 10/1951 | Coler | 18/47.5 |
| 3,281,511 | 10/1966 | Goldsmith | 264/49 |
| 3,506,493 | 4/1970 | Eisenberg | 136/86 |
| 3,518,332 | 6/1970 | Sklarchuk et al. | 264/49 |
| 3,556,161 | 1/1971 | Roberts | 138/141 |
| 3,661,645 | 5/1972 | Strier et al. | 136/20 |
| 3,813,461 | 5/1974 | Murayama et al. | 264/41 |
| 3,817,772 | 6/1974 | Heit | 117/11 |
| 3,852,224 | 12/1974 | Bridgeford | 260/2.5 M |
| 3,859,402 | 1/1975 | Bintleff et al. | 264/49 |
| 3,890,417 | 6/1975 | Vallance | 264/49 |
| 3,930,886 | 1/1976 | Mesiti et al. | 136/146 |
| 3,930,979 | 1/1976 | Vallance | 204/252 |
| 3,944,477 | 3/1976 | Argade | 204/266 |
| 4,031,000 | 6/1977 | Nakamura et al. | 204/252 |
| 4,049,589 | 9/1977 | Sakane | 260/2.5 M |
| 4,098,672 | 7/1978 | Riley | 204/296 |
| 4,110,153 | 8/1978 | Rechlicz | 156/633 |
| 4,135,996 | 1/1979 | Bouy et al. | 204/296 |
| 4,165,271 | 8/1979 | Kadija | 204/252 |
| 4,170,537 | 10/1929 | Simmons | 204/295 |
| 4,170,538 | 10/1979 | Simmons | 204/295 |
| 4,170,539 | 10/1979 | Simmons | 204/295 |
| 4,170,540 | 10/1979 | Lazarz et al. | 204/296 |

FOREIGN PATENT DOCUMENTS

| | | | |
|---|---|---|---|
| 1491033 | 6/1967 | France | 204/296 |
| 1081046 | 8/1967 | United Kingdom | 204/296 |
| 1364683 | 8/1974 | United Kingdom | 204/295 |

OTHER PUBLICATIONS

"PTFE Sample" Dielectric Inc.
"Estimation of Thickness of Filtering Diaphragm of Electrolysis Vessels for Prep. of Chlorine & Alkali", V. L. Kubasov, *Electro-khimiya*, vol. 12, No. 1, pp. 76-79, 1/76

Primary Examiner—R. L. Andrews
Attorney, Agent, or Firm—Peter F. Casella; Howard M. Ellis

[57] ABSTRACT

The invention disclosed herein relates to a polymeric microporous electrolytic cell separators for producing alkali metal hydroxide at high current efficiencies, said separator having:

a. porosity of at least about 60%;
b. thickness of between 8 and 130 mils;
c. hysteresis of from 0.30 to 0.99 wherein hysteresis is defined as the ratio of the amount of mercury trapped within the pore structure of the separator after release of pressure to 1 psi compared to the amount of mercury present when first subjected to total impregnation by mercury at 50,000 psi, and
d. distribution of pore sizes in a range between 0.004 and 34 microns wherein at least 85% of said pores have a diameter of between 0.12 and 33 microns and at least 60% of said pores have a diameter between 0.59 and 33 microns;

wherein the porosity, thickness, hysteresis, and pore size distribution are adapted to provide the separator with the property of exhibiting a high current efficiency including the property of a current efficiency of about 85% to about 98% when measured at a sodium hydroxide concentration of 150 gpl. The separator also possesses hydraulic properties which renders them suitable for use in a commercial scale cell.

Also disclosed herein is a method for preparing the separators of this invention comprising the steps (a) forming a sheet comprising a fluorocarbon polymer, a pore forming additive and a fluorinated surface active agent; (b) sintering the sheet; and (c) removing the pore forming additive.

32 Claims, 4 Drawing Figures

POLYMERIC MICROPOROUS SEPARATORS FOR USE IN ELECTROLYTIC PROCESSES AND DEVICES

CROSS-REFERENCES TO RELATED APPLICATIONS

This application is a continuation-in-part of application Ser. No. 957,515 filed Nov. 3, 1978 now abandoned.

FIELD OF THE INVENTION

This invention relates to polymeric microporous electrolytic cell separators for use in electrolytic and fuel cells.

BACKGROUND OF THE INVENTION

Chlorine and caustic soda are produced commercially by electrolytic methods, primarily from aqueous solutions of alkali metal chlorides. In the electrolysis of brines, chlorine is produced at the anode and hydrogen, together with an alkali metal hydroxide, such as sodium or potassium hydroxide at the cathode. As the anode and cathode products must be kept separate many cell designs have been developed utilizing a separator, such as a diaphragm or membrane or a mercury intermediate electrode to separate anolyte and catholyte products.

In the diaphragm cell process, brine is fed continuously into the electrolytic cell and flows from the anode compartment through an asbestos diaphragm into the cathode compartment. To minimize back-diffusion and migration, the flow rate is adjusted such that only part of the salt is converted. The hydrogen ions are discharged from the solution at the cathode forming hydrogen gas and leaving hydroxyl ions. This catholyte solution, containing sodium hydroxide and unchanged sodium chloride, is evaporated to obtain sodium hydroxide product. In the course of the evaporation the sodium chloride precipitates, is separated, redissolved, and recirculated back into the cell. The function of the diaphragm, conventionally asbestos or polymer reinforced asbestos, is to maintain the level of concentration of alkali to minimize diffusional migration of hydroxyl ions into the anolyte, and to maintain separation of hydrogen and chlorine. Of course, it is desirable that the diaphragm also have minimal electrical resistance and extended life in the environment of the cell.

In the mercury cell process, an alloy or amalgam is formed between the discharged cation and the mercury. This amalgam flows or is pumped to a separate reaction chamber where it is allowed to undergo reaction, most often with water to form hydrogen and a comparatively strong sodium hydroxide solution containing almost no sodium chloride.

The diaphragm process is inherently cheaper than the mercury process, but as the former process does not provide chloride-free alkali additional processing steps are necessary to purify and concentrate the alkali.

Substitution of an ion exchange membrane material for the diaphragm has been proposed. Numerous permselective liquid impermeable membrane materials have been suggested. For example, membranes are described in U.S. Pat. Nos. 2,636,851; 2,967,807; 3,017,338; and British Pat. Nos. 1,184,321 and 1,199,952. Such membranes are substantially impervious to hydraulic flow. During operation, brine is introduced into the anode compartment wherein chlorine is liberated. Then, in the case of cation permselective membrane, sodium ions are transported across the membrane and into the catholyte compartment by ion exchange mechanism. The concentration of the relatively pure caustic produced in the catholyte compartment is determined by the amount of water added to this compartment from an external source, as well as by the migration of water in the cell, i.e. . . . by osmosis and/or electro-osmosis. While operation of a membrane cell has many theoretical advantages, its commercial application to the production of chlorine and caustic has been hindered by the often erratic operating characteristics of the cells. A number of disadvantages have been present when using these membranes, including a relatively high electrical resistance, poor permselectivity and oxidative degeneration, as well as relatively high cost.

As an alternative to asbestos diaphragms and liquid impermeable ion exchange membranes, industry has sought a suitable porous or microporous polymeric diaphragm material. Such a diaphragm material would for example have such desirable characteristics as maximum chemical stability, low electrical resistance, and hydraulic properties similar to an asbestos diaphragm. Other necessary properties include sufficient mechanical strength to withstand handling during assembly of a cell, shape and dimensional stability when wet with electrolyte, controlled porosity and sufficient density to act as a physical barrier to resist pentration of the matrix by gaseous reactants. That is, the polymeric diaphragm matrix must have a porosity sufficient to permit sufficient flow of brine from the anolyte to the catholyte compartment to maintain a desired caustic concentration, minimize caustic back migration and separate gaseous chlorine and hydrogen at minimum electrical resistivity, and be inert to the electrolyte system.

References may be found relating to such microporous diaphragm materials. Mention may be made more particularly to the following patents which employ techniques of compression pore forming followed by fritting or sintering, or techniques of coagulation of a mixture for the deposition on a support.

French Pat. No. 1,491,033, of Aug. 31, 1966, relates to a process for manufacturing porous diaphragms which consists of mixing a solid additive in particulate form into an aqueous dispersion of polytetrafluoroethylene in the presence of particulate inorganic fillers, coagulating the dispersion, placing the resultant coagulum in sheet form, and removing the solid particulate additive from the sheet. The removable particulate additive generally consists of starch or calcium carbonate, and is removable by immersion of the resultant sheet in hydrochloric acid. Alternatively, the additive may also be a polymer which is soluble in an organic solvent, or depolymerizable, or evaporable upon heating of the sheet. The particulate inorganic fillers which are suitable include barium sulfate, titanium dioxide, and asbestos.

U.S. Pat. No. 3,890,417, issued June 17, 1975, teaches a method for manufacturing a porous diaphragm comprising preparing an aqueous slurry or dispersion consisting of polytetrafluoroethylene and solid particulate additive, thickening and aqueous slurry or dispersion to affect agglomeration of solid particles therein, forming a dough-like material containing sufficient water to serve as a lubricant in a subsequent sheet forming operation, forming a sheet of desired thickness, and removing the solid particulate additive from the sheet. The solid particulate additive may be any which is substantially insoluble in water, but which is removable by a suitable chemical or physical means. Examples indicated are starch, and calcium carbonate.

U.S. Pat. No. 3,281,511, issued Oct. 25, 1956, discloses preparing microporous polytetrafluoroethylene resin sheets by mixing fine polytetrafluoroethylene powder with a carrier and readily removable filler material, rolling the thus made dough with intermediate reorientation, so that the particles are biaxially oriented. The solvent is then evaporated and the polytetrafluoroethylene is sintered at above its melting temperature, followed by removal of the filler by an appropriate solvent. The carrier material is readily vaporizable material such as naptha, or petroleum distillate, such as Stoddard solvent, which is a standard petroleum distillate having a flash point not lower than 100° F., comprised largely of saturated hydrocarbons.

U.S. Pat. No. 3,556,161, issued Jan. 19, 1971, relates to polytetrafluoroethylene sheet materials formed by the "fritforming" process, comprising mixing polytetrafluoroethylene powder with a liquid such as kerosene, and then sequentially working the resultant composition by the application of concurrent compressive stress and shear stress, the sequence of operation being directed so the shear stress components are distributed substantially biaxially, resulting in planar orientation in the resultant article. As is the case with the materials formed by the process of U.S. Pat. No. 3,281,511, the sheet material is biaxially oriented and of high tensile strength.

British Pat. No. 1,473,286, discusses diaphragms fabricated from PTFE and a pore forming agent. As aqueous homogeneous paste is rolled to form the diaphragm, followed by sintering and removal of the pore forming agent. The actual current efficiencies of such diaphragms during electrolysis are below commercially acceptable levels.

These and other well known techniques, in the case of polytetrafluoroethylene, have not been capable of producing microporous diaphragms having acceptable performance, in that satisfactory mechanical properties, such as proper porosity etc. have not been achieved.

It is an object of the present invention to provide microporous separators suitable for electrolytic cells. It is further an object of this invention to identify those necessary characteristics of a microporous diaphragm, to achieve the necessary balance of properties for a commercially acceptable electrolytic cell separator.

BRIEF DESCRIPTION OF THE INVENTION

In accordance with the foregoing objectives this invention provides a polymeric microporous electrolytic cell separator for producing alkali metal hydroxide at high current efficiencies, said separator having hydraulic properties adapted to facilitate the flow of brine therethrough and having:

a. porosity of at least about 60%;

b. thickness of between 8 and 130 mils;

c. hysteresis of from 0.30 to 0.99 wherein hysteresis is defined as the ratio of the amount of mercury trapped within the pore structure of the separator after release of pressure to 1 psi compared to the amount of mercury present when first subjected to total impregnation by mercury at 50,000 psi, and d. distribution of pore sizes in a range between 0.004 and 34 microns wherein at least 85% of said pores have a diameter of between 0.12 and 33 microns and at least 60% of said pores have a diameter between 0.59 and 33 microns;

wherein said porosity, thickness, hysteresis, and pore size distribution are adapted to provide said separator with the property of exhibiting a high current efficiency including a current efficiency of about 85% to about 98% when measured at sodium hydroxide concentration of 150 gpl.

Preferably the porosity, thickness, hysteresis, and distribution of pore diameters is related to current efficiency by the following relationship:

$$CE = A + Bx + Cx_1 + Dx_2 + Ex_3 + Fx_4 + Gx_5 + Jx_6 + Kx_7$$

wherein:

$A$ = Constant = $+116.4$ $Bx = -11.07$ [(Porosity) (hysteresis) ÷ (thickness)]

$Cx_1 = +1.495$ (Zone D + Zone F)

$Dx_2 = -0.9290$ (Zone F + Zone G)

$Ex_3 = -1.153$ (Zone E + Zone F)

$Fx_4 - 1.484$ (Zone C + Zone D)

$Gx_5 + 92.37$ (hysteresis)

$Jx_6 - 1.756$ (thickness) (hysteresis)

$Kx_7 + 0.9026$ (thickness)

wherein Zones C–G represents percentages of pores having diameter ranges:

Zone C = 0.59 to 1.309 microns

Zone D = 1.31 to 2.949 microns

Zone E = 2.95 to 6.59 microns

Zone F = 6.60 to 14.759 microns

Zone G = 14.76 to 33 microns

This invention also provides a method for making the polymeric microporous separators described above. The method of this invention comprises the steps of (a) forming a sheet comprising polytetrafluoroethylene, a pore forming additive and a lubricant; (b) sintering the sheet, and (c) removing the pore forming additive. A nonionic fluorinated surface active agent is preferred for use as the lubricant. Moreover, it is preferred to employ roll milling to reduce the sheet to the desired thickness, by milling the sheet a number of times between the rolls of a roll mill.

As described herein the size of the pore forming additive may be adjusted and the milling process performed so as to provide a separator wherein the current efficiency of the separator is related to its porosity, hysteresis, thickness and pore diameter distribution in accordance with the formula:

$$CE = A + Bx + CX_1 + Dx_2 + Ex_3 + Gx_5 + Jx_6 + Kx_7$$

wherein the parameters of this equation are defined above. Preferably the current efficiency is from about 85 to 98% when measured at a sodium hydroxide concentration of 150 gpl in a chlor-alkali cell having a brine head height of from about 2 to 40 inches.

The Description of the Invention which follows refers to the FIGS. I–IV wherein:

FIG. I: is a plot of zones C–G versus the % of pores included within each zone, for a separator having a thickness of 20, 30, or 40 mils, having a porosity of 80% and a hysteresis of 0.95 to 0.99.

FIG. II: is a plot of zones C–G versus the % of pores within each zone for a separator having a porosity of 85, 80 or 75%, a thickness of 20 mils and hysteresis of 0.95 to 0.99.

FIG. III: is a plot of zones C–G versus the % of pores within each zone for a separator having a porosity of 85, 80 or 75%, a thickness of 40 mils and a hysteresis of 0.95 to 0.99.

FIG. IV: is a plot of zones C–G versus the % of pores within each zone for a separator having a porosity of 85, 80 or 75%, a thickness of 30 mils and a hysteresis of 0.95 to 0.99.

DESCRIPTION OF THE INVENTION

It has now been discovered that the necessary characteristics of a microporous diaphragm suitable for use in a chlor-alkali cell may be defined in such a manner as to predict performance. It has been learned that certain physically measurable factors control the operating characteristics of microporous separators prepared from polytetrafluoroethylene or other polymeric materials.

In discussing the microporous separators herein reference is made principally to polytetrafluoroethylene (PTFE). However, this is for convenience purposes only, and should not be construed as restrictive to the scope of suitable polymers which may be employed in fabricating separators with the described physical properties. Such properties apply broadly to a wide range of homopolymers and copolymers with the only actual restriction being that they be capable of withstanding the internal environment of an electrolytic cell. Although a wide range of thermoplastic polymers are applicable to the present invention, fluorine-containing homo- and copolymers appear best suited. In addition to polytetrafluoroethylene, other satisfactory fluoropolymers include polyvinylfluoride, polyvinylidenefluoride, polychlorotrifluoroethylene, polyfluoroethylenepropylene, polyfluoroalkoxyethylene, and copolymers like chlorotrifluoroethylene plus ethylene. Non-fluorine containing polymers include PVC, post-chlorinated PVC, polyethylene, polypropylene, polyvinylchloride, polysulfones, and the like. It is to be understood however, that the latter group of polymers although they may be used as cell separators their life expectancy is shorter than the fluoropolymers, and therefore, are less preferred.

It is well established that a diaphragm must be sufficiently porous to be permeable to electrolyte. However, it has been discovered that the porosity of a microporous separator should be at least about 60%, and more specifically between about 60 and about 90%. Most preferably, separators of the instant invention should have a porosity from 70 to about 90%.

Porosity is based on mercury porosimeter analysis as outlined in the upcoming reference. In addition to total porosity per se, pore size distribution is also a critical factor. Using a mercury porosimeter, it has been discovered that for an electrolytic separator to operate at commercially acceptable current efficiency of at least 85% when the sodium hydroxide concentration is 150 grams/liter the pores should have a range of sizes between 0.004 and 34 microns in diameter, and at least 85% of the pores should have a diameter of between 0.12 and 33 microns. Further, we have learned there is a distribution of pore diameters required within the range from 0.12 to 33 microns. The pore sizes have been sequented between 0.12 and 33 microns into a plurality of zones with each zone chosen to achieve an approximately 5 fold difference between the ratio of the squares of the diameter of the largest and smallest pores therein. The following zone designations represent the percentage of pores of a particular diameter range:

Zone A = 0.12 to 0.259 microns
Zone B = 0.26 to 0.589 microns
Zone C = 0.59 to 1.309 microns
Zone D = 1.31 to 2.949 microns
Zone E = 2.95 to 6.59 microns
Zone F = 6.60 to 14.759 microns
Zone G = 14.76 to 33 microns Utilizing these zone designations, one may determine the percentage of pores within each zone, as measured by the mercury porosimeter.

In addition, it has been learned that a microporous separator performing at high current efficiencies of at least about 85% should be between 8 and 130 mils thickness, and more specifically, between 8 and 100 mils. Preferably, separators of the present invention are between 20 and 60 mils thickness, and most preferably, between 30 and 50 mils thickness. As indicated, it is within the scope of the invention to include microporous separators of greater than 100 mils thickness, for the electrical energy (KWH) required per ton of chlorine produced in an electrolytic cell is lowered by maximizing current efficiency and minimizing cell voltage. In general, for cell separators of identical porosity and pore structure the thicker the separator the higher the current efficiency and cell voltage. Thus, it is permissible within the framework of the present invention to prepare thicker cell separators than, for example, 130 mils, but there would be little added benefit to do so because it would increase the voltage disproportionately to the current efficiency. Accordingly, thicker separators become economically unfeasible.

An additional factor bearing directly upon the preformance of the microporous separator of the present invention is tortuosity of the pores themselves. This factor is measurable utilizing a mercury porosimeter, in terms of hysteresis. This factor relates to time of passage of electrolyte through the microporous separator, as opposed to the length of the individual pores. Hysteresis may be defined as the ratio of the amount of mercury trapped within the pore structure of the separator after release of pressure to 1 psi compared to the amount of mercury present when first subjected to total impregnation by mercury at 50,000 psi. Thus, hysteresis is a measure of retention of liquid mercury in the pores of the separator. In this regard, it has been learned that hysteresis should be inversely proportional to the thickness of the film, in that for a separator to provide high current efficiencies a thin film requires a much higher hysteresis than a thicker film. Preferably, a 10 mil thick separator should achieve a hysteresis of from 0.95 to 0.99, while a 100 mil thick separator has been found to be most effective with a hysteresis of from 0.50 to 0.70.

Accordingly, it has been discovered that four physical properties of a polymeric microporous electrolytic cell separator, namely, (a) porosity, (b) thickness, (c) hysteresis, and (d) distribution of pore sizes control performance characteristics of the separator in terms of actual current efficiencies in an electrolytic cell. Most importantly however, it has been observed that properties a-d are inter-related, and that the performance of a separator can be controlled by changing one or more of such properties within the specified ranges. That is to say, there is a close correlation between the observed current efficiency of a separator as it actually performs in the electrolytic cell and the calculated current efficiency whereby the actual current efficiency can be predicted and thereby optimized by adjusting properties a-d according to the formula:

$$CE = A + Bx + Cx_1 + Dx_2 + Ex_3 + Fx_4 + Gx_5 + Jx_6 + Kx_7.$$

Thus, a microporous electrolytic cell separator may be fabricated for producing alkali metal hydroxide at a commercially desirable current efficiency of about 85% to about 98% when the alkali metal hydroxide concentration is 150 gpl., wherein the separator has the properties:

(a) porosity of at least about 60%;
(b) thickness of between 8 and 130 mils;
(c) hysteresis of from 0.30 to 0.90 wherein hysteresis is defined as the ratio of the amount of mercury trapped within the pore structure of the separator after release of pressure to 1 psi compared to the amount of mercury present when first subjected to a total impregnation by mercury at 50,000 psi;
(d) distribution of pore sizes in a range between 0.004 and 34 microns wherein at least 85% of said pores have a diameter of between 0.12 and 33 microns and at least 60% of said pores have a diameter between 0.59 and 33 microns;

whereby the relationship of a–d to the current efficiency of the separator is expressed by the formula:

$$CE = A + Bx + Cx_1 + Dx_2 + Ex_3 + Fx_4 + Gx_5 + Jx_6 + Kx_7$$

wherein:

$A$ = constant = $+116.4$
$Bx = -11.07$[(porosity) (hysteresis) $\div$ (thickness)]
$Cx_1 = +1.495$ (Zone D + Zone F)
$Dx_2 = -0.9290$ (Zone F + Zone G)
$Ex_3 = -1.153$ (Zone E + Zone F)
$Fx_4 = -1.484$ (Zone C + Zone D)
$Gx_5 = +92.37$ (hysteresis)
$Jx_6 = -1.756$ (thickness) (hysteresis)
$Kx_7 = +0.9026$ (thickness)

wherein Zones C–G represent percentages of pores having diameter ranges:

Zone C = 0.59 to 1.309 microns
Zone D = 1.31 to 2.949 microns
Zone E = 2.95 to 6.59 microns
Zone F = 6.60 to 14.759 microns
Zone G = 14.76 to 33 microns For a porous polytetrafluoroethylene or other inert organic resin based membrane, commercially acceptable as a diaphragm in a cell for the electrolysis of alkali metal halide producing chlorine and alkali metal hydroxide, said diaphragm should produce alkali metal hydroxide at a concentration of 150 gpl NaOH, or higher, at a Faradaic efficiency of about 85% or higher. To achieve this result the microporous separator herein should possess the combination of physical properties (a–d) in a balanced relationship as expressed by the foregoing formula. This formula was developed using a stepwise multiple regression analysis of experimental data. Statistical interpretation of the results shows that there is a 95.2% probability for experimental points to fall within a standard deviation of 5.2%. Most properties of the porous separators can be characterized by use of a mercury porosimeter as taught in "Application of Mercury Penetration to Materials Analysis" by Clyde Orr, Jr., published in *Powder Technology*, 3 (1969/70), pages 117–123, which publication is incorporated-by-reference herein.

FIG. I provides a plot of zones C–G as defined above versus the percentage of pores within each zone, for a separator having a thickness of 20, 30 or 40 mils, and having a porosity of 80%, and a hysteresis of 0.95 to 0.99. FIG. I was obtained by overlaying the individual plots of zones C–G versus pore % distribution within each zone for individual 20, 30 and 40 mil separators. Thus, the distribution of pores within zones C–G for a 20, 30 or 40 mil separator is defined by the area encompassed by the plot line for that thickness. For example, the pore distribution for a 40 mil separator is defined by the area encompassed by the solid plot line connecting the points $X_1$, $X_2$, $Y_2$, $Z_3$, $Q_2$, $R_6$, $R_5$, $R_4$, $R_2$ and $R_1$. Similarly, for a 30 mil separator the permissable pore distribution is defined by the area encompassed by the line $X_1$, $X_2$, $X_3$, $X_4$, $Y_3$, $Z_2$, $Q_4$, $R_6$, $R_5$, $R_3$, $R_2$ and $R_1$. For a 20 mil separator the permissable pore distribution is defined by the line $X_1$, $X_2$, $X_3$, $Y_3$, $Z_2$, $Q_3$, $R_6$, $R_5$, $R_3$, $R_2$, and $R_1$. The percent distribution of pores within zone C is defined by data points $X_1$, $X_2$, $X_3$ and $X_4$; zone D by points $Y_1$, $Y_2$ and $Y_3$; zone E by points $Z_1$, $Z_2$ and $Z_3$; zone F by points $Q_1$, $Q_2$, $Q_3$ and $Q_4$ and zone G by points $R_1$, $R_2$, $R_3$, $R_4$, $R_5$, and $R_6$. FIGS. II–IV are read and interpreted in a manner similar to that described above for FIG. I.

It should also be noted with reference to FIGS. I–IV that zones C–F represent ranges of pore sizes which abut each other, and therefore, they should not be read as absolute points. Moreover, with reference to the side-boundaries of the plot any pore % point above a zone designation point should be read to define a permissable range of pore sizes from 0% to the pore % point within that zone.

A separator defined by FIG. I will be operable at a current efficiency of about 95%, when measured at a sodium hydroxide concentration of 150 grams per liter when (1) from 60 to 100% of the pores fall within zones C–G, and (2) when the separator has the thickness, hysteresis, and porosity given for FIG. I. Table A summarizes the data points of FIG. I:

TABLE A

| Data Points Zone C | % Pores | Thickness (mils) |
|---|---|---|
| $X_1$ | 10 | 20, 30, 40 |
| $X_2$ | 20 | 20, 30, 40 |
| $X_3$ | 30 | 20, 30 |
| $X_4$ | 40 | 30 |

| Data Points Zone C | % Pores | Thickness |
|---|---|---|
| $Y_1$ | 10 | 20, 30, 40 |
| $Y_2$ | 50 | 20, 30, 40 |
| $Y_3$ | 60 | 30, 20 |

| Data Points Zone D | % Pores | Thickness |
|---|---|---|
| $Z_1$ | 0 | 20, 30, 40 |
| $Z_2$ | 40 | 20, 30, 40 |
| $Z_3$ | 50 | 40 |

| Data Points Zone F | % Pores | Thickness |
|---|---|---|
| $Q_1$ | 0 | 20, 30, 40 |
| $Q_2$ | 80 | 40, 30, 20 |
| $Q_3$ | 90 | 20, 30 |
| $Q_4$ | 100 | 30 |

| Data Points Zone G | % Pores | Thickness |
|---|---|---|
| $R_1$ | 0 | 20, 30, 40 |
| $R_2$ | 10 | 20, 30, 40 |
| $R_3$ | 20 | 20, 30 |
| $R_4$ | 30 | 40 |
| $R_5$ | 40 | 20, 30, 40 |
| $R_6$ | 50 | 20, 30, 40 |

The data from Table A indicates that for a separator having a thickness of 40 mils, hysteresis of 0.95 to 0.99 and porosity of 80%, the percent distribution of pores within zones C–G is as follows:

| | |
|---|---|
| Zone C | 0 to 20% |
| Zone D | 0 to 50 |
| Zone E | 0 to 50 |
| Zone F | 0 to 80 |
| Zone G | 30 to 50 |

Similarly for a thickness of 30 mils:

| | |
|---|---|
| Zone C | 0 to 40% |
| Zone D | 0 to 60 |
| Zone E | 0 to 40 |
| Zone F | 0 to 100 |
| Zone G | 0 to 50 |

And for a thickness of 20 mils:

| | |
|---|---|
| Zone C | 0 to 30% |
| Zone D | 0 to 60 |
| Zone E | 0 to 40 |
| Zone F | 0 to 90 |
| Zone G | 0 to 50 |

FIG. II provides a plot of zones C–G versus the percentage of pores within each zone, for a separator having a porosity of 85, 80, or 75%, a thickness of 20 mils and a hysteresis of from 0.95 to 0.99. Thus, for a given thickness and hysteresis, FIG. II correlates the pore distribution within zones C–G to porosity. The permissable distribution of pores within zones C through G for a porosity of 75, 80 or 85% is defined by the area embraced by the plot line for that particular porosity. FIG. II was obtained by overlaying the individual plots of pore % versus zone for 20 mil separators having porosities of 75, 80 and 85%. FIGS. III and IV are similar to FIG. II except that the thickness of the separator is fixed at 40 or 30 mils respectively rather than at 20 mils as in FIG. II. A separator wherein from 60 to 100% of the pores are distributed within zones C–G in accordance with the distribution defined by FIGS. II–IV, and having the given thickness, porosity and hysteresis, will exhibit a current efficiency of about 95% when measured at a sodium hydroxide concentration of 150 grams per liter in a chlor-alkali cell. Table B summarizes the data points of FIG. II:

TABLE B

| Data Points Zone C | % Pores | Porosity % |
|---|---|---|
| $X_1$ | 10 | 75, 80, 85 |
| $X_2$ | 20 | 75, 80, 85 |
| $X_3$ | 30 | 75, 80, 85 |

| Data Points Zone D | % Pores | Porosity % |
|---|---|---|
| $Y_1$ | 10 | 75, 80, 85 |
| $Y_2$ | 60 | 75, 80, 85 |

| Data Points Zone E | % Pores | Porosity % |
|---|---|---|
| $Z_1$ | 30 | 75, 80, 85 |
| $Z_2$ | 40 | 75, 80 |

TABLE B-continued

| Data Points Zone F | % Pores | Porosity % |
|---|---|---|
| $Q_1$ | 70 | 75, 80, 85 |
| $Q_2$ | 90 | 80 |

| Data Points Zone G | % Pores | Porosity % |
|---|---|---|
| $R_1$ | 10 | 75, 80, 85 |
| $R_2$ | 20 | 80, 85 |
| $R_3$ | 30 | 75 |
| $R_4$ | 40 | 75, 80, 85 |
| $R_5$ | 50 | 80 |
| $R_6$ | 60 | 75 |

The data summarized in Table B indicates that for a separator having a porosity of 85%, a thickness of 20 mils, and a hysteresis of 0.95 to 0.99 the percent distribution of pores within zones C to G is as follows:

| | |
|---|---|
| Zone C | 0 to 30% |
| Zone D | 0 to 60 |
| Zone E | 0 to 30 |
| Zone F | 0 to 70 |
| Zone G | 0 to 40 |

Similarly for a 20 mil separator having a porosity of 80%, the zone distribution is as follows:

| | |
|---|---|
| Zone C | 0 to 30% |
| Zone D | 0 to 60 |
| Zone E | 0 to 40 |
| Zone F | 0 to 90 |
| Zone G | 0 to 50 |

For a 20 mil separator having a porosity of 75% the pore distribution is as follows:

| | |
|---|---|
| Zone C | 0 to 30% |
| Zone D | 0 to 50 |
| Zone E | 0 to 40 |
| Zone F | 0 to 90 |
| Zone G | 0 to 60 |

FIG. III is a plot similar to FIG. II, with the exception that the thickness of the separator is 40 mils. Thus, FIG. III provides a plot of pore distribution, versus zones C–G, for 40 mil separators having a hysteresis of from 0.95 to 0.99, and porosities of 75, 80 and 85%. Table C summarizes the data points of FIG. III.

TABLE C

| Data Points Zone C | % Pores | Porosity (%) |
|---|---|---|
| $X_1$ | 10 | 75, 80, 85 |
| $X_2$ | 20 | 75, 80, 85 |
| $X_3$ | 30 | 75, 80 |
| $X_4$ | 40 | 75 |

| Data Points Zone D | % Pores | Porosity (%) |
|---|---|---|
| $Y_1$ | 10 | 75, 80, 85 |
| $Y_2$ | 40 | 75, 80, 85 |
| $Y_3$ | 50 | 75, 80 |

| Data Points Zone E | % Pores | Porosity (%) |
|---|---|---|
| $Z_1$ | 20 | 75, 80, 85 |

TABLE C-continued

| | | |
|---|---|---|
| $Z_2$ | 30 | 75, 80 |
| $Z_3$ | 50 | 80 |

| Data Points Zone F | % Pores | Porosity (%) |
|---|---|---|
| $Q_1$ | 70 | 75, 80, 85 |
| $Q_2$ | 80 | 80, 85 |

| Data Points Zone G | % Pores | Porosity (%) |
|---|---|---|
| $R_1$ | 10 | 75, 80, 85 |
| $R_2$ | 20 | 75, 80 |
| $R_3$ | 30 | 80, 85 |
| $R_4$ | 50 | 80 |
| $R_5$ | 60 | 85 |

The data summarized in Table C indicates that for a separator having a porosity of 85%, a thickness of 40 mils and a hysteresis of 0.95 to 0.99, the percent distribution of pores within zones C–G is as follows:

| Zone C | 0 to 30% |
|---|---|
| Zone D | 0 to 40 |
| Zone E | 0 to 20 |
| Zone F | 0 to 80 |
| Zone G | 0 to 60 |

Similarly for a 40 mil separator having a porosity of 80% the pore distribution is as follows:

| Zone C | 0 to 20% |
|---|---|
| Zone D | 0 to 50 |
| Zone E | 0 to 50 |
| Zone F | 0 to 80 |
| Zone G | 0 to 50 |

For a 40 mil separator having a porosity of 75%, the distribution of pores within zones C through G is as follows:

| Zone C | 0 to 40% |
|---|---|
| Zone D | 0 to 50 |
| Zone E | 0 to 30 |
| Zone F | 0 to 70 |
| Zone G | 0 to 20 |

FIG. IV is similar to FIGS. II and III except that thickness of the separator is 30 mils. Thus, FIG. IV provides a plot of zones C through G versus the percentage of pores within each zone, for a 30 mil separator having a hysteresis of 0.95 to 0.99, and a porosity of 75, 80 or 85%. Table D summarizes the data points of FIG. III:

TABLE D

| Data Points Zone C | % Pores | Porosity % |
|---|---|---|
| $X_1$ | 10 | 75, 80, 85 |
| $X_2$ | 20 | 75, 80, 85 |
| $X_3$ | 30 | 75, 80, 85 |
| $X_4$ | 40 | 80 |

| Data Points Zone D | % Pores | Porosity % |
|---|---|---|
| $Y_1$ | 50 | 75, 80, 85 |
| $Y_2$ | 60 | 80 |

| Data Points Zone E | % Pores | Porosity % |
|---|---|---|
| $Z_1$ | 40 | 75, 80, 85 |
| $Z_2$ | 50 | 85 |

| Data Points Zone F | % Pores | Porosity % |
|---|---|---|
| $Q_1$ | 40 | 75, 80, 85 |
| $Q_2$ | 50 | 80, 85 |
| $Q_3$ | 100 | 80 |

| Data Points Zone G | % Pores | Porosity % |
|---|---|---|
| $R_1$ | 10 | 75, 80, 85 |
| $R_2$ | 20 | 75, 80, 85 |
| $R_3$ | 30 | 75, 80 |
| $R_4$ | 40 | 75, 80 |
| $R_5$ | 50 | 80, 75 |
| $R_6$ | 60 | 85 |

The data summarized in Table D indicates that for a separator having a porosity of 85%, a thickness of 30 mils and a hysteresis of 0.95 to 0.99 the percent distribution within zones C to G is as follows:

| Zone C | 0 to 30% |
|---|---|
| Zone D | 0 to 50 |
| Zone E | 0 to 50 |
| Zone F | 0 to 50 |
| Zone G | 0 to 60 |

Similarly for a 30 mil separator having a porosity of 80% the pore distribution within zones C to G is as follows:

| Zone C | 0 to 40% |
|---|---|
| Zone D | 0 to 60 |
| Zone E | 0 to 40 |
| Zone F | 0 to 100 |
| Zone G | 0 to 50 |

For a 30 mil separator having a porosity of 75% the data of Table D indicates the following pore distribution:

| Zone C | 0 to 30% |
|---|---|
| Zone D | 0 to 50 |
| Zone E | 0 to 40 |
| Zone F | 0 to 40 |
| Zone G | 0 to 50 |

It should be noted with reference to FIGS. I–IV, that although the plot lines are drawn for separators having thicknesses of 20, 30 or 40 mils in FIG. I and for separators having porosities of 75, 80 or 85% in FIGS. II–IV, FIGS. I–IV may also be read to provide an indication of the permissable pore distribution intermediate the plotted 20–40 mil thicknesses and 75 to 85% porosities. For example, with reference to FIG. I, a separator having a thickness of 35 mils should have a maximum percent distribution within zone E of about 45%, as would be indicated by a point intermediate the 30 mil max $Z_2$ and the 40 mil max $Z_3$. A separator having a 25 mil thickness should have a maximum distribution within zone E corresponding to the point $Z_2$ as is indicated by the fact that the maximum $Z_2$ remained unchanged when the thickness was increased from 20 to 30 mils. FIGS. II–IV may be read in a similar manner to provide an indication of the pore distribution for separators having porosities intermediate the plotted 75, 80 and 85% porosities.

Although separators having the specific combination of critical features described herein may be prepared by various techniques, a preferred method of manufacturing is by the calendering of mixtures of polymer eg . . . polytetrafluoroethylene and removable pore forming materials, followed by sintering of the resin and subsequent removal of pore formers. A particularly preferred technique is that set forth in U.S. patent application Ser. No. 891,987, filed Mar. 31, 1978, and continutation-in-part application Ser. No. 64,616, filed Aug. 7, 1979, the contents of which are incorporated herein by reference. This patent application teaches that effective microporous separators may be prepared by preparing a blend of particulate polymer, a dry pore forming particulate material, and an organic lubricant. The materials are milled and formed into a sheet, which is then rolled to the desired thickness, sintered, and subjected to leaching of the pore forming material. The organic lubricant is preferably an organic fluorosurfactant, while the pore forming material is preferably particulate calcium carbonate, and the mixture comprises from 5 to about 30% lubricant, with the ratio of particulate additive to polymer being from about 10:1 to about 5:1.

Several factors have been identified which are thought to influence the balance between separator thickness, hysteresis, porosity and distribution of pore sizes. These factors include techniques and materials utilized in the preparation of the separators. A summary of the effect of such factors follows.

The lubricant utilized has an effect upon the final distribution of pore sizes within a microporous separator. Many organic solvents noted below can be used as "carrier medium" for the polytetrafluoroethylene and the pore former, thus easing the mixing and milling capability of polytetrafluoroethylene and the pore former, the eliminating the possibility of a static charge developing on the rollers. Most preferably, the lubricant should be able to "wet" the polytetrafluoroethylene. Experiments which have been conducted show a preference for a fluorosurfactant as the lubricant. The use of such fluorosurfactant lubricants is set for in U.S. applications Ser. Nos. 891,987 and 64,616, previously identified. In addition, such lubricants as kerosene, naphtha, petroleum distillant and water may also be used.

The pore former selected has a major effect upon pore size distribution in a microporous separator. Almost anything can be used as a pore former which can be removed from the polymer subsequent to sintering. The pore former should retain its physical properties during mixing, rolling and sintering processes. Thus, it is preferable to use a pore former having a hardness greater than that of the polymeric material, thus allowing, for example, a fluorocarbon resin to flow around the pore former during the milling operation. Specifically suggested is calcium carbonate, because of its availability in large quantities and initial screening cuts. It is important to use a narrow range of particle size of calcium carbonate. The narrowness of the size range helps to eliminate a broad pore size distribution, and enables better control of pore size during milling, thus leading to a more uniform membrane.

For the same milling conditions, there is a relationship between the size of the pore former and the size of the polymer particles. Frequently in the plastics industry, pore formers of less than 10 microns are employed. An increase in a separator's efficiency may be realized, however, by increasing the size of the pore former, while more control over the final product may also be gained by the use of a larger pore former.

It is also noteworthy that the ratio of the size of pore former to the size of the polytetrafluoroethylene that may be used to produce an efficient separator is related to the amount of the pore former and the amount of resin utilized. Many pores are needed to produce the porous, low voltage, efficient separator desired. Thus, a larger amount of a small size pore former will yield a lower voltage for the membrane, while maintaining high efficiency, than a lesser amount of a larger pore former for the same size and amount of polytetrafluoroethylene. The ratio of pore former to resin used is dependent on the desired porosity. Generally, the calcium carbonate used is four to five times the amount of polymer to achieve a porosity of about 70%. The amount of pore former employed may be in this formulation, increased to obtain porosities greater than 70%. Porosity is a factor in controlling the voltage and anolyte head height of an efficient separator. Thus, given an efficient separator, the formulation employed to prepare the separator may be modified to include a greater amount of pore former, which will result in lower voltages and lower anolyte head heights that could be obtained with the separator prepared employing the original formulation. The cell efficiency is not necessarily sacrificed, if the thickness of the membrane or hysteresis thereof is maintained. The increased amount of pore former will not necessarily change the average porosity of the efficient separator, but can increase the frequencies of large pores and may cause a shift in pore distribution toward larger pores. It must be kept in mind that the efficient separator is not dependent upon pore former alone.

The hysteresis, porosity, thickness, and pore distribution of the separator define the physical properties of a separator capable of being adapted for use in a conventional chlor-alkali cell at high current efficiency. However, the hydraulic properties of the separator are important in a practical sense. That is, during the operation of a commercial chlor-alkali cell, brine is fed continuously into the anolyte compartment, and the flow of brine through the separator and into the catholyte compartment is adjusted so as to maintain the sodium hydroxide concentration in the catholyte compartment at a sufficiently high level so as to minimize the back migration of hydroxide ion. When the flowthrough properties of the separator are poor, in order to operate the cell at, for example, a commercially acceptable 150 gpl sodium hydroxide concentrate, and a current efficiency of about 85% or higher, it would be necessary to compensate for the poor flow-through properties by adjusting the brine head height relative to the liquid level in the catholyte compartment. Chlor-alkali cells typically employ brine head heights of from about 2 to 40 inches for commercial scale operation, wherein the brine head height is defined as the difference in liquid levels in the catholyte and anolyte compartments. When the flow-through properties of a separator are poor however, impractical head heights as high as about 90 inches may be required. However, brine head heights greater than 40 inches are commercially unacceptable since the inherent structural limitations of a commercial cell preclude the use of head heights greater than about 40 inches.

As mentioned above, one factor affecting brine head height is porosity. However, flow-through and brine head height are not determined by porosity alone. It is believed that a factor contributing to the flow-through properties of the separator is the number or density of pores of the separator. Thus, for a given porosity, if the pore density is too low i.e. too many large pores, the flow-through properties may be unacceptable, and the head height could be unacceptably high. The flow-through properties of a separator may be adjusted and improved by increasing the pore density of the separator. This could be accomplished by employing a "smaller sized" pore former in a given formulation or by increasing the amount of pore former employed relative to the resin. Thus, the separators of this invention are adapted in terms of porosity which is at least about 60%, as well as pore density, to facilitate the flow of brine through the separator and, thereby, to render the separator suitable for use in commercial chlor-alkali cells.

It is believed that any polymer powder size may be used to produce an efficient membrane, within the range of from about 20 to 750 microns. Of course, it may be necessary to compensate for different size polymer powders by control of other factors. Further, polytetrafluoroethylene generally considered suitable for molding, such as DuPont PTFE No. 7A, available from E. I. DuPont de Nemours, is a softer powder. Some difficulties in initial milling arise when using a softer powder, but such difficulties may be overcome by increasing the lubricant, the initial number of passes to form a sheet, or by changing the sequence.

The polymer pore former and lubricant should be mixed via low intensity, low speed blending, such as obtained by the use of a V-shaped blender. The order and time of blending influences the degree of mixing of the material, which may be further magnified or compensated for by the initial milling procedure and/or subsequent milling step.

It has been found that high intensity, high speed mixing causes the material to lump together, non-uniformally. It should be noted that polytetrafluoroethylene "cold flows" and that high intensity, high speed mixing puts "work" into the material, which does not necessarily equate with good mixing. If high intensity, high speed mixing is to be utilized it must be closely controlled, so as to produce a limited amount of orientation of all of the particles. However, it is more beneficial and more controllable to employ a low intensity, low speed mixing system initially. Subsequent to blending with the V-shaped blender, a rolling mill may be utilized to further mix and blend the polytetrafluoroethylene and pore former, if necessary.

It has been found that a limited amount of controlled working is necessary to manufacture an efficient membrane. While the membrane may undergo a large number of milling steps, it does not necessarily hold that the increased milling will yield the most efficient membrane. Thus, once a membrane has been milled beyond a certain point and/or thickness, it may be very difficult or economically unfeasible to restore the efficiency of the damaged membrane through further milling. The amount and type of milling controls the efficiency of the separator to a certain extend. Induction of too much shear by reducing the gap between the rollers too quickly, will lower the efficiency of the separator. However, not enough reduction in the gap during milling may cause delamination problems. More shear is induced at higher roller ratios and at higher speeds. Thus, some tradeoffs may be obtained between the amount of shear and thickness being milled. Maintaining a fairly constant amount of work to the material produces a more efficient separator. In other words, it is important to avoid overmilling in a single pass, but to gradually reduce the thickness of the membrane through a number of milling steps. However, thinning alone does not produce an efficient membrane. The amount of thinning employed per se should be limited since it can weaken the wall structure of the pores, causing the pores to "blow open" and widen the overall pore distribution. This is especially apparent when working with materials less than 20 mils thick.

The speed at which the material is milled is preferably slow, on the order of 5 feet per minute. Initially, to form a sheet, this is critical as it is necessary to control the total amount of work induced, and forming a sheet at higher speeds can increase the possibility of too much work being induced, causing the material to become brittle. The material can be milled at a faster speed but repetative steps and/or changes in gap reduction have to be made to control the amount of work induced.

Thus, in the manufacture of the suitable microporous separator tradeoffs may be made with respect to the type and the amount of folding and thinning and the amount of shear and speed utilized. The combination of steps in the milling sequence appear to be more important than the total number of passes through the rollers. In each instance, gap settings and roller ratios are to be considered.

An increase in thickness of a microporous separator does not automatically insure greater efficiency. Thickness can improve the efficiency of a membrane having a wider pore distribution through nullifying the potential of caustic back migration. A separator with a very broad pore distribution would require great thickness in order to operate efficiently. In the case of separators of greater thickness care should be exercised against decreasing porosity. Since the probability of closed pores increases with thicker membrane samples, it may be necessary to increase the size and/or the amount of pore former. In addition, milling procedures could also be altered to obtain closer control of pore distribution.

Another factor is the hysteresis, or pore complexity, or tortuosity of the pores. A thicker separator with a low pore complexity may be the equivalent of a thinner member with a high pore complexity, since pore complexity is a measure of pass length of fluid through the pore. The amount of hysteresis required for an efficient operation is inversely proportional to the thickness of the separator. A thin separator of 7–8 mils requires a hysteresis of 95% or greater, whereas a thick separator of 100 mils may need as little as 40% hysteresis. Thus, tradeoffs may be made between the pore size and thickness of the separator for the required amount of hysteresis. The average pore size that may be tolerated for an efficient separator is function of the amount of hysteresis and the thickness of the membrane, coupled with the type of pore distribution. Whereas hysteresis gives an indication of the complexity of the pores, it is possible to introduce a greater overall amount of hysteresis into a thicker membrane than a thin one. This may not be necessary for efficient operation of a separator however since pore length is inherently greater in a thicker membrane. However, some hysteresis is required, as it will affect the voltage and hydraulics of the separator.

Further, drying of the membrane prior to sintering should be conducted over a lengthy period of time, to insure that all volatile material is driven off without effecting pore structures. Sintering may then be performed at a temperature high enough to fuse the resin, and long enough to ensure that the membrane material is fused throughout its thickness.

The numerous following examples illustrate specific methods for preparing the polymeric electrolytic cell separators of the present invention and demonstrate the close correlation between the actual and calculated current efficiencies based on the foregoing equation. It is to be understood however, that these examples are for illustrative purposes only and do not purport to be wholly definitive as to conditions and scope.

EXAMPLES 1-3

80 grams of polytetrafluoroethylene powder identified as Teflon ® PTFE powder #7A from E. I. DuPont de Nemours, was blended with 217 grams of calcium carbonate, identified as Dryca-Flow 225 AB from Sylacauga Calcium Products having an average particle size greater than 104 microns, but less than 150 microns. The calcium carbonate powder was sifted using a Roto-Tap sifter. The materials were mixed for 1 minute in a V-blender after which 80 ml of DuPont's Zonyl ® FSN fluorosurfactant was added as a lubricant and blended for 5 minutes. Zonyl FSN is a non-ionic surfactant, identified as fluoroalkyl poly(ethyleneoxy)ethanol.

The formulations for Examples 2 and 3 are shown in Table I below.

TABLE I

| EXAMPLE | PTFE TYPE | PTFE grams | CaCO₃ (grams) | CaCO₃ screened sized microns |
|---|---|---|---|---|
| 2 | # 7A | 32.5 | | |
|   | # 6A | 32.5 | 232 | >74 - <104 |
| 3 | # 6A | 80 | 217 | >43 - <53 |

| EXAMPLE | MIXING TIME (min) | ZONYL FSN (ml) | MIXING TIME (min) |
|---|---|---|---|
| 2 | 2 | 65 | 5 |
| 3 | 1 | 80 | 5 |

Upon completion of mixing the resulting mixture was removed from the V-shaped blender for miling in a two roll rubber mill having 10 inch wide rolls and a diameter of 3.95 inches. The mill operated at a speed of 4.9 ft/sec with a roller ratio of 1:1. Examples 1-3 were rolled according to the milling procedures shown in Table II.

TABLE II

| | EXAMPLE 1 | | | EXAMPLE 2 | | | EXAMPLE 3 | |
|---|---|---|---|---|---|---|---|---|
| | Gap Setting (inches) | Milling Procedure | | Gap Setting (inches) | Milling Procedure | | Gap Setting (inches) | Milling Procedure |
| (1) | .050 | allow material to wrap rollers until sheet is formed; remove sheet | (1) | .043 | allow material to wrap rollers until sheet is formed; remove sheet | (1) | .043 | allow material to wrap rollers until sheet is formed; remove sheet |
| (2) | .050 | fold in thirds, reorient 90°, mill | (2) | .043 | mill | (2) | .057 | fold parallel, mill |
| (3) | .050 | fold in fourths, reorient 90°, mill | (3) | .057 | fold parallel, mill | (3) | .074 | fold in thirds, reorient 90°, mill |
| (4) | .057 | fold in thirds, reorient 90°, mill | (4) | .074 | fold in thirds, reorient 90°, mill | (4) | .074 | fold parallel, mill |
| (5) | .074 | fold in thirds, reorient 90°, mill | (5) | .074 | fold parallel, mill | (5) | .057 | thin |
| (6) | .074 | fold in thirds, reorient 90°, mill | (6) | .057 | thin | (6) | .043 | thin |
| (7) | .107 | fold in thirds, reorient 90°, mill | (7) | .043 | thin | (7) | .057 | fold in thirds, reorient 90°, mill |
| (8) | .091 | thin | (8) | .057 | fold in thirds, reorient 90°, mill | (8) | .074 | fold parallel, mill |
| (9) | .074 | thin | (9) | .074 | fold parallel, mill | (9) | .057 | thin |
| (10) | .057 | thin | (10) | .057 | thin | (10) | .043 | thin |
| (11) | .050 | thin | (11) | .043 | thin | (11) | .074 | fold in thirds, reorient 90°, mill |
| | | | (12) | .074 | fold in thirds, reorient 90°, mill | (12) | .057 | thin |
| | | | (13) | .057 | thin | (13) | .043 | thin |
| | | | (14) | .043 | thin | (14) | .057 | fold parallel, mill |
| | | | (15) | .030 | thin | (15) | .074 | fold in thirds, reorient 90°, mill |
| | | | | | | (16) | .107 | fold parallel, mill |
| | | | | | | (17) | .091 | thin |
| | | | | | | (18) | .074 | thin |
| | | | | | | (19) | .057 | thin |
| | | | | | | (20) | .043 | thin |
| | | | | | | (21) | .057 | fold in thirds, reorient 90°, mill |
| | | | | | | (22) | .091 | fold parallel, mill |
| | | | | | | (23) | .074 | thin |
| | | | | | | (24) | .057 | thin |
| | | | | | | (25) | .043 | thin |
| | | | | | | (26) | .074 | fold in thirds, reorient 90°, mill |
| | | | | | | (27) | .057 | thin |
| | | | | | | (28) | .043 | thin |
| | | | | | | (29) | .030 | thin |

The rolled materials, after thinning to the indicated thicknesses were dried in a step-wise fashion at temperatures from 100° C. to 250° C. progressively, to remove all of the volatile components of the fluorosurfactant material. After drying thoroughly, the temperature was gradually increased to a temperature of from 340°-360° C. in order to sinter the polytetrafluoroethylene particles. The sintering temperature was maintained for a period of from 90 to 210 minutes. After cooling, the sintered polytetrafluoroethylene sheet was then leached successively with hydrochloric acid solution to remove the calcium carbonate. After rinsing, and a series of leaching and rinsing steps, the microporous polytetrafluoroethylene separators were ready for evaluation in a chlor-alkali cell and mercury porosimeter. The analysis in the mercury porosimeter was made in accordance with the instruction manual on a mercury penetration porosimeter Model 900/910 series from Micromeritics Instrument Corp.

The microporous polytetrafluoroethylene membranes prepared according to Examples 1-3 were tested individually in a laboratory scale chlor-alkali electrolytic cell. Prior to installation in the electrolytic cell the separator was pre-wetted using an aqueous solution containing 0.1% by weight Zonyl FSN surfactant. The laboratory cell was equipped with an anode consisting of titanium mesh coated with a noble metal oxide. The cathode was a perforated steel plate. The microporous polytetrafluoroethylene was inserted into the cell as a separator between the anode and cathode. Sodium chloride brine having a concentration of 320 grams per liter was fed into the anolyte compartment and flowed through the electrolytic separator into the cathode compartment. A current density of 1.5 amps per square inch was applied to the electrodes. The total current applied to the cell was 7.74 amperes. Chlorine was produced at the anode and hydrogen gas and sodium hydroxide at the cathode. The anolyte compartment was equipped with a hydrostatic head so that brine continually flowed through the separator. The catholyte compartment contained an overflow permitting sodium hydroxide produced in the cell to be collected.

The amount of sodium hydroxide produced over a 16 hour period of time was used to calculate the current efficiency. The chlorine produced was vented to a scrubber and the hydrogen produced was vented to an exhaust system. The cell operated at about 85° C. The KWH per ton of chlorine produced according to each of the examples herein below ranged from 2450 to 7570.

Table III provides data on the physical properties of the microporous separators of Examples 1-3 and their performance characteristics as measured by caustic current efficiency at 150 grams per liter sodium hydroxide.

TABLE III

| % PORES 0.12– | (1) (2) PORE DISTRIBUTION (%) | | | | | | |
|---|---|---|---|---|---|---|---|
| | 0.12–.259 | 0.26–0.589 | 0.59–1.309 | 1.31–2.949 | 2.95–6.59 | 6.60–14.759 | 14.76–33 |

TABLE III-continued

| EX. | 33 $\mu$ | $\mu$ | $\mu$ | $\mu$ | $\mu$ | $\mu$ | $\mu$ | $\mu$ |
|---|---|---|---|---|---|---|---|---|
| 1 | 91.11 | 5.75 | 12.31 | 15.14 | 19.11 | 18.49 | 11.20 | 9.11 |
| 2 | 93.78 | 4.66 | 6.10 | 13.84 | 21.57 | 21.61 | 16.01 | 9.99 |
| 3 | 91.24 | 10.44 | 10.75 | 16.66 | 21.75 | 15.38 | 11.16 | 5.09 |

| EX. | THICK-NESS mils | PORO-SITY % | HYSTER-ESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 1 | 59 | 72.4 | 0.72 | 92.5 | 93.1 |
| 2 | 42 | 75.4 | 0.89 | 86.5 | 89.3 |
| 3 | 52 | 71.8 | 0.94 | 98.5 | 96.4 |

EXAMPLES 4–6

Three additional microporous separators were prepared with polytetrafluoroethylene, pore forming calcium carbonate and fluorosurfactant using the specific ingredients set forth in Table IV. Procedures for blending the ingredients of the mixtures correspond to Example 1–3.

TABLE IV

| EXAMPLE | PTFE TYPE | PTFE grams | CaCO$_3$ grams | CaCO$_3$ microns |
|---|---|---|---|---|
| 4 | 6 | 50 | 247 | Unscreened Dryca-Flow 225 AB |
| 5 | 7A | 50 | 308.75 | >61 – <74 |
| 6 | 7A | 50 | 247 | >61 – <74 |

| EXAMPLE | MIXING TIME (min) | ZONYL FSN (ml) | MIXING TIME (min) |
|---|---|---|---|
| 4 | 6 | 50 | 5 |
| 5 | 1 | 100 | 5 |
| 6 | 1 | 75 | 15 |

Table V describes the milling procedures employed in manufacturing the separators of Examples 4–6. The same two roll rubber mill used for Examples 1–3 was also employed in preparing Examples 4–6, however, roller ratios were 1.4:1.

TABLE V

| EXAMPLE 4 | | EXAMPLE 5 | | EXAMPLE 6 | |
|---|---|---|---|---|---|
| Gap Setting (inches) | Milling Procedure | Gap Setting (inches) | Milling Procedure | Gap Setting (inches) | Milling Procedure |
| (1) .074 | allow material to wrap single roller until sheet is formed, remove sheet | (1) .043 | allow material to wrap single roller until sheet is formed; remove sheet | (1) .043 | allow material to wrap roller until sheet is formed; remove sheet |
| (2) .057 | thin | (2) .074 | fold parallel, mill | (2) .074 | fold parallel, mill |
| (3) .043 | thin | (3) .057 | thin | (3) .057 | thin |
| (4) .074 | fold parallel, mill | (4) .043 | thin | (4) .043 | thin |
| (5) .057 | thin | (5) .074 | fold in fourths, reorient 90°, mill | (5) .074 | fold in thirds, reorient 90°, mill |
| (6) .043 | thin | (6) .107 | fold in thirds, reorient 90°, mill | (6) .107 | fold in thirds, reorient 90°, mill |
| (7) .091 | fold in thirds, reorient 90°, mill | (7) .091 | thin | (7) .091 | thin |
| (8) .074 | thin | (8) .074 | thin | (8) .074 | thin |
| (9) .057 | thin; changed roller ratio to 1:1 | (9) .057 | thin | (9) .057 | thin |
| (10) .057 | milled straight through | (10) .043 | thin | (10) .043 | thin |
| (11) .043 | thin; changed roller ratio to 1.4:1 | (11) .107 | fold parallel, mill | (11) .107 | fold parallel, mill |
| (12) .091 | fold in thirds, reorient 90°, mill | (12) .091 | thin | (12) .091 | thin |
| (13) .074 | thin | (13) .074 | thin | (13) .074 | thin |
| (14) .057 | thin | (14) .057 | thin | (14) .057 | thin |
| (15) .043 | thin | (15) .043 | thin | (15) .043 | thin |
| | | (16) .027 | thin | (16) .027 | thin |
| | | (17) .010 | thin | (17) .010 | thin |
| | | | | (18) .010 | fold parallel, mill |

TABLE V-continued

| | EXAMPLE 4 | | | EXAMPLE 5 | | | EXAMPLE 6 | |
|---|---|---|---|---|---|---|---|---|
| | Gap Setting (inches) | Milling Procedure | | Gap Setting (inches) | Milling Procedure | | Gap Setting (inches) | Milling Procedure |
| (16) | .027 | thin | (18) | .010 | fold parallel, mill | (19) | .010 | fold parallel, mill |
| (17) | .010 | thin | (19) | .010 | fold parallel, mill | (20) | .010 | fold parallel, mill |
| (18) | .002 | thin | (20) | .010 | fold parallel, mill | (21) | .010 | fold parallel, mill |
| (19) | .043 | fold in fourth's, reorient 90°, mill | (21) | .010 | fold parallel, mill | (22) | .010 | fold parallel, mill |
| | | | (22) | .010 | fold parallel, mill | (23) | .010 | flipped over and milled last end out, first end in |
| (20) | .027 | thin | (23) | .010 | flipped over and milled last end out, first end in | | | |
| (21) | .010 | thin | | | | | | |
| (22) | .002 | thin | | | | | | |

After the completion of milling according to the steps set forth in Table V the samples were treated by drying, sintering, leaching and rinsing steps as taught in Examples 1-3. Subsequently, Examples 4-6 were evaluated using the same chlor-alkali cell and mercury porosimeter used for Examples 1-3. Data characterizing the performance of the polytetrafluoroethylene separators and their physical properties is provided in Table VI.

TABLE VI

| | PORE DISTRIBUTION (%) | | | | | | |
|---|---|---|---|---|---|---|---|
| EX. | % PORES 0.12– 33 $\mu$ | 0.12– .259 $\mu$ | 0.26– 0.589 $\mu$ | 0.59– 1.309 $\mu$ | 1.31– 2.949 $\mu$ | 2.95– 6.59 $\mu$ | 6.60– 14.759 $\mu$ | 14.76– 33 $\mu$ |
| 4 | 89.60 | 5.37 | 9.19 | 7.11 | 4.85 | 26.34 | 19.58 | 17.16 |
| 5 | 90.57 | 5.59 | 8.15 | 8.33 | 12.27 | 19.96 | 16.76 | 19.51 |
| 6 | 92.13 | 4.68 | 7.02 | 7.21 | 14.23 | 20.69 | 17.70 | 20.60 |

| EX. | THICKNESS mils | POROSITY % | HYSTERESIS % 1 psia | ACTUAL CURRENT EFFICIENCY @ 150 gpl NaOH | CALCULATED CURRENT EFFICIENCY @ 150 gpl NaOH |
|---|---|---|---|---|---|
| 4 | 9 | 85.4 | .85 | 29.5 | 31.9 |
| 5 | 15 | 87.0 | .88 | 67.5 | 68.3 |
| 6 | 19 | 84.6 | .99 | 77.0 | 79.2 |

The data in Table VI shows low current efficiencies with relatively thin separators in the range of 9 to 19 mils thickness. The low current efficiencies were due to too high percentages of large pores in the range of 6.60 microns and above for separators of this thickness.

EXAMPLE 7

A polytetrafluoroethylene separator was made by first mixing for two minutes in a V-shaped blender 247 grams of calcium carbonate having particle sizes greater than 61 microns but less than 74 microns with 50 ml kerosene. Subsequently, 50 grams of Teflon powder #6 was added and mixed for 5 minutes. The resulting material was rolled on the two roll rubber mill described in Examples 1-3. Example 7 was rolled according to the milling procedure shown in Table VII.

TABLE VII

| | Gap Setting (inches) | Milling Procedure |
|---|---|---|
| (1) | .043 | allow material to wrap around rollers until single sheet is formed. remove sheet. Changed roller ratio to 1:1 |
| (2) | .043 | straight through |
| (3) | .043 | fold parallel, mill |
| (4) | .010 | fold parallel, mill |
| (5) | .043 | fold parallel, mill |
| (6) | .043 | fold parallel, mill |
| (7) | .043 | straight through |
| (8) | .043 | straight through |
| (9) | .043 | fold in thirds, reorient 90°, mill |
| (10) | .074 | fold in thirds, reorient 90°, mill |
| (11) | .074 | straight through |
| (12) | .043 | thin |
| (13) | .010 | thin |
| (14) | .043 | fold parallel, mill |
| (15) | .043 | fold parallel, mill |
| (16) | .074 | straight through |
| (17) | .043 | thin |
| (18) | .027 | thin |
| (19) | .010 | thin |
| (20) | .074 | fold in eights, reorient 90°, mill |
| (21) | .057 | thin |
| (22) | .043 | thin |
| (23) | .027 | thin |
| (24) | .010 | milled last end out, first end in |

Drying, sintering, leaching and rinsing steps used in connection with Example 7 were identical to the steps used in Examples 1-3. The microporous polytetrafluoroethylene separator was then ready for evaluation in the laboratory scale chlor-alkali cell and mercury porosimeter. The test data on Example 7 is shown in Table VIII.

TABLE VIII

| | PORE DISTRIBUTION (%) | | | | | | |
|---|---|---|---|---|---|---|---|
| EX. | % PORES 0.12– 33 $\mu$ | 0.12– .259 $\mu$ | 0.26– 0.589 $\mu$ | 0.59– 1.309 $\mu$ | 1.31– 2.949 $\mu$ | 2.95– 6.59 $\mu$ | 6.60– 14.759 $\mu$ | 14.76– 33 $\mu$ |
| 7 | 94.74 | 6.13 | 7.93 | 10.09 | 3.39 | 34.61 | 18.89 | 13.70 |

| EX. | THICKNESS mils | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 7 | 27 | 80.6 | .98 | 69.0 | 73.7 |

The membrane of Example 7 provided low caustic current efficiencies because of the high percentage of large pores in the range of 2.95 microns and above for a membrane of this thickness.

EXAMPLE 8

A stabilized asbestos filled diaphragm separator was prepared by vacuum depositing on a foraminous steel structure from a slurry comprising 0.95 wt. % asbestos plus 0.05 wt. % Halar ® powder (a trademark of Allied Chemical Corporation for a 1:1 weight ratio of chlorotrifluoroethylene and ethylene) suspended in a bath containing 150 grams per liter sodium hydroxide plus 170 grams per liter sodium chloride. The deposited diaphragm was dried at about 110° C. then brought up to 270° C. and held at that temperature for 1 hour. After cooling, the stabilized asbestos diaphragm was removed from the foraminous steel structure, alternately washed with distilled water, 0.1 Nitric acid and distilled water to remove the sodium chloride and sodium hydroxide picked up from the depositing bath. The stabilized asbestos was then dried at about 100° C. After drying the separator was approximately ⅛ inch thick having an apparent density of 0.247 pounds per square foot of which 0.234 pounds per square foot was asbestos and the remainder Halar resin. The microporous asbestos filled separator of Example 8 was ready for evaluation in the chlor-alkali cell and mercury porosimeter. Test data in connection with Example 8 is shown in Table IX below.

TABLE IX

| EX. | % PORES 0.12–33 μ | PORE DISTRIBUTION (%) | | | | | | |
|---|---|---|---|---|---|---|---|---|
| | | 0.12–.259 μ | 0.26–0.589 μ | 0.59–1.309 μ | 1.31–2.949 μ | 2.95–6.59 μ | 6.60–14.759 μ | 14.76–33 μ |
| 8 | 88.62 | 6.67 | 5.52 | 11.95 | 14.71 | 23.10 | 18.39 | 8.28 |

| EX. | THICKNESS mils | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 8 | 125 | 75.3 | .52 | 95.0 | 96.9 |

EXAMPLE 9

An electrolytic cell separator having the properties set forth in Table X was installed in the chlor-alkali cell of Examples 1–3 and operated for 12 days at a cell voltage of 4.20.

TABLE X

| EX. | % PORES 0.12–33 μ | PORE DISTRIBUTION (%) | | | | | | |
|---|---|---|---|---|---|---|---|---|
| | | 0.12–.259 μ | 0.26–0.589 μ | 0.59–1.309 μ | 1.31–2.949 μ | 2.95–6.59 μ | 6.60–14.759 μ | 14.76–33 μ |
| 9 | 91.63 | 9.96 | 18.13 | 0 | 27.69 | 12.15 | 18.13 | 5.58 |

| EX. | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 9 | 9 | 72.4 | .96 | 89.5 | 83.0 |

EXAMPLES 10 AND 11

Examples 10 and 11 relate to separators having properties identified in Table XI. Both were installed in the chlor-alkali cell of Examples 1–3. Example 10 operated for 9 days at a voltage of 3.85 volts. Example 11 operated for 8 days at 3.80 volts.

TABLE XI

| EX. | % PORES 0.12–33 μ | PORE DISTRIBUTION (%) | | | | | | |
|---|---|---|---|---|---|---|---|---|
| | | 0.12–.259 μ | 0.26–0.589 μ | 0.59–1.309 μ | 1.31–2.949 μ | 2.95–6.59 μ | 6.60–14.759 μ | 14.76–33 μ |
| 10 | 96.25 | 1.19 | 5.45 | 22.40 | 17.66 | 22.70 | 19.36 | 7.49 |
| 11 | 93.99 | 1.13 | 1.19 | 1.93 | 2.61 | 7.31 | 23.41 | 56.41 |

| EX. | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 10 | 40 | 80.1 | .84 | 75.0 | 74.9 |
| 11 | 28 | 82.8 | .33 | 71.5 | 67.7 |

The low caustic current efficiencies demonostrated for Examples 10 and 11 are attributed to a diffuse pore distribution, i.e., too high a percentage of pores throughout the 0.59 to 6.6 micron range in the case of Example 10 and an excessive amount of large pores in a 14.76 to 33 micron range in the case of Example 11.

EXAMPLE 12

50 grams of polytetrafluoroethylene-Teflon #6A was milled with 247 grams of calcium carbonate having particle sizes of greater than 104 microns but less than 150 microns. The product was mixed in a V-shaped blender for 1 minute and 80 mls of Zonyl FSN fluorosurfactant was added to the dry mixture and blended for an additional 5 minutes. The material was milled using the apparatus of Examples 1–3. The mill was set at a gap of 0.05 inches. The material was loaded onto the mill and allowed to wrap around the rollers and removed in a single sheet. The separator was dried, sintered, leached and rinsed according to the steps of Examples 1–3. The microporous polytetrafluoroethylene separator was ready for evaluation in the chlor-alkali cell and mercury porosimeter. The data characterizing the performance of the separator is provided in Table XII.

TABLE XII

| EX. | % PORES 0.12–33 μ | PORE DISTRIBUTION (%) | | | | | | |
|---|---|---|---|---|---|---|---|---|
| | | 0.12–.259 μ | 0.26–0.589 μ | 0.59–1.309 μ | 1.31–2.949 μ | 2.95–6.59 μ | 6.60–14.759 μ | 14.76–33 μ |
| 12 | 91.34 | 1.99 | 3.41 | 3.91 | 16.41 | 30.89 | 21.02 | 13.71 |

| EX. | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 12 | 49 | 80.11 | .67 | 90.0 | 86.4 |

EXAMPLE 13

A microporous separator was prepared by mixing 50 grams of Teflon grade 7A powder with 247 grams of calcium carbonate screened to a particle size of more than 43 microns to less than 53 microns. The PTFE and calcium carbonate were mixed in a V-shaped blender for 1 minute followed by the addition of 65 mls of Zonyl FSN. The mixture was blended for an additional 5 minutes. The mixture was milled on a two roll rubber mill as used in Examples 1-3. The procedures for milling the material are set forth in Table XIII below.

TABLE XIII

| | Gap Setting (inches) | Milling Procedure |
|---|---|---|
| (1) | .050 | load material, allowed to wrap, re-loaded, continued wrapping, removed single sheet |
| (2) | .050 | fold in thirds, reorient 90°, mill |
| (3) | .050 | fold in thirds, reorient 90°, mill |
| (4) | .057 | fold in thirds, reorient 90°, mill |
| (5) | .074 | fold in thirds, reorient 90°, mill |
| (6) | .074 | fold in thirds, reorient 90°, mill |
| (7) | .108 | fold in half, reorient 90°, mill |
| (8) | .091 | thin |
| (9) | .074 | thin |
| (10) | .057 | thin |
| (11) | .050 | thin |

The milled material was dried, sintered, leached and rinsed according to the steps employed in Examples 1-3. The microporous PTFE separator was ready for evaluation in the chlor-alkali cell and mercury porosimeter. Data on the performance of the separator is shown in Table XIV.

TABLE XIV

| EX. | % PORES 0.12– 33 μ | PORE DISTRIBUTION (%) | | | | | | |
|---|---|---|---|---|---|---|---|---|
| | | 0.12– .259 μ | 0.26– 0.589 μ | 0.59– 1.309 μ | 1.31– 2.949 μ | 2.95– 6.59 μ | 6.60– 14.759 μ | 14.76– 33 μ |
| 13 | 90.57 | 7.64 | 8.29 | 16.75 | 18.21 | 19.76 | 11.38 | 8.54 |

| EXAMPLE | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 13 | 49 | 73.01 | .98 | 90.0 | 88.6 |

EXAMPLE 14

A PTFE microporous separator was prepared in accordance with the composition and method of Example 2 except that 362.5 grams of calcium carbonate was used screened to a particle size of more than 61 microns but less than 74 microns. The milling, drying, leaching and rinsing steps also corresponded to those steps of Example 2.

TABLE XV

| EX. | % PORES 0.12– 33 μ | PORE DISTRIBUTION (%) | | | | | | |
|---|---|---|---|---|---|---|---|---|
| | | 0.12– .259 μ | 0.26– 0.589 μ | 0.59– 1.309 μ | 1.31– 2.949 μ | 2.95– 6.59 μ | 6.60– 14.759 μ | 14.76– 33 μ |
| 14 | 91.94 | 5.99 | 9.06 | 12.89 | 14.40 | 19.49 | 16.31 | 13.80 |

| EXAMPLE | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 14 | 36 | 80.48 | .94 | 94.0 | 89.2 |

EXAMPLE 15

The PTFE microporous separator was prepared with the same composition and process steps of mixing, milling, drying, leaching and rinsing as Example 2, except the roller ratio was changed to 1.4:1. Physical properties and performance characteristics were determined in a laboratory chlor-alkali cell and mercury porosimeter providing the data set forth in Table XVI.

TABLE XVI

| EX. | % PORES 0.12– 33 μ | PORE DISTRIBUTION (%) | | | | | | |
|---|---|---|---|---|---|---|---|---|
| | | 0.12– .259 μ | 0.26– 0.589 μ | 0.59– 1.309 μ | 1.31– 2.949 μ | 2.95– 6.59 μ | 6.60– 14.759 μ | 14.76– 33 μ |
| 15 | 93.87 | 4.20 | 5.54 | 12.85 | 25.21 | 21.45 | 15.42 | 9.19 |

| EX. | THICK-NESS mil | POR-OS-ITY % | HYS-TER-ESIS @ 1 psia | ACTUAL CURRENT EFFI-CIENCY @ 150 gpl NaOH | CALCU-LATED CURRENT EFFI-CIENCY @ 150 gpl NaOH |
|---|---|---|---|---|---|
| 15 | 39 | 69.21 | .77 | 89.5 | 93.7 |

EXAMPLE 16

A polytetrafluoroethylene microporous separator was prepared employing materials and methods corresponding to Example 2 above, except that the second milling step of 0.043 mls was eliminated and 0.057 inch fold parallel, mill and all milling steps thereafter were performed at a mill speed of 51.7 ft/min., and thereafter three passes were made through the mill at the indicated gap setting instead of once only. Table XVII below provides the physical characteristics and performance data in the chlor-alkali cell.

TABLE XVII

| EX. | % PORES 0.12– 33 μ | PORE DISTRIBUTION (%) | | | | | | |
|---|---|---|---|---|---|---|---|---|
| | | 0.12–.259 μ | 0.26–0.589 μ | 0.59–1.309 μ | 1.31–2.949 μ | 2.95–6.59 μ | 6.60–14.759 μ | 14.76–33 μ |
| 16 | 92.12 | 5.59 | 8.03 | 14.92 | 26.01 | 17.83 | 12.17 | 7.57 |

TABLE XVII-continued

| EX. | THICK-NESS mil | POR-OS-ITY % | HYS-TER-ESIS @ 1 psia | ACTUAL CURRENT EFFI-CIENCY @ 150 gpl NaOH | CALCU-LATED CURRENT EFFI-CIENCY @ 150 gpl NaOH |
|---|---|---|---|---|---|
| 16 | 43 | 72.70 | .89 | 92.0 | 96.9 |

EXAMPLE 17

A microporous separator was prepared by mixing 50 grams of Teflon grade 7A powder with 247 grams of calcium carbonate screened to a particle size of more than 104 microns to less than 150 microns. The PTFE and calcium carbonate were mixed in a V-shaped blender for 1 minute followed by the addition of 50 mls of Zonyl FSN fluorosurfactant. The mixture was blended for an additional 5 minutes. The procedure for milling the material are set forth in Table XVIII below.

TABLE XVIII

| Gap Setting (inches) | Milling Procedure |
|---|---|
| .050 | load material, allow to wrap, reloaded material, remove sheet |
| .057 | fold parallel, mill |
| .074 | fold in thirds, reorient 90°, mill |
| .074 | fold parallel, mill |
| .057 | thin |
| .050 | thin |
| .057 | fold in thirds, reorient 90°, mill |
| .074 | fold parallel, mill |
| .057 | thin |
| .050 | thin |
| .074 | fold in thirds, reorient 90°, mill |
| .057 | thin |
| .050 | thin |
| .057 | fold parallel, mill |
| .074 | fold in thirds, reorient 90°, mill |
| .108 | fold parallel, mill |
| .091 | thin |
| .074 | thin |
| .057 | thin |
| .050 | thin |
| .057 | fold in thirds, reorient 90°, mill |
| .125 | fold parallel, mill |
| .1075 | thin |
| .091 | thin |
| .074 | thin |
| .057 | thin |
| .050 | thin |
| .125 | fold in thirds, reorient 90°, mill |
| .1075 | thin |
| .091 | thin |
| .074 | thin |
| .057 | thin |
| .050 | thin |

The milled material was dried, sintered, leached and rinsed according to the steps employed in Examples 1–3. The microporous PTFE separator was ready for evaluation in the chlor-alkali cell and mercury porosimeter.

Performance data and physical characteristics of the separator are shown in Table XIX below.

TABLE XIX

| EX. | % PORES 0.12– 33 μ | PORE DISTRIBUTION (%) | | | | | | |
|---|---|---|---|---|---|---|---|---|
| | | 0.12–.259 μ | 0.26–0.589 μ | 0.59–1.309 μ | 1.31–2.949 μ | 2.95–6.59 μ | 6.60–14.759 μ | 14.76–33 μ |
| 17 | 88.73 | 10.55 | 14.64 | 16.09 | 21.18 | 13.91 | 8.73 | 3.64 |

TABLE XIX-continued

| EXAMPLE | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 17 | 64 | 69.15 | .95 | 90.0 | 95.6 |

TABLE XXII

| EX. | % PORES 0.12–33 μ | 0.12–.259 μ | 0.26–0.589 μ | 0.59–1.309 μ | 1.31–2.949 μ | 2.95–6.59 μ | 6.60–14.759 μ | 14.76–33 μ |
|---|---|---|---|---|---|---|---|---|
| 21 | 91.38 | 3.85 | 10.97 | 18.28 | 20.17 | 16.38 | 13.97 | 7.77 |

| EXAMPLE | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 21 | 41 | 75.68 | .90 | 96.0 | 92.1 |

EXAMPLES 18-19

Two Teflon separators were prepared using the same materials mixing and milling procedures as Example 2, except the final thinning step at 0.30 inch gap was eliminated. Performance data and properties are provided in Table XX.

TABLE XX

| EX. | % PORES 0.12–33 μ | 0.12–.259 μ | 0.26–0.589 μ | 0.59–1.309 μ | 1.31–2.949 μ | 2.95–6.59 μ | 6.60–14.759 μ | 14.76–33 μ |
|---|---|---|---|---|---|---|---|---|
| 18 | 88.75 | 6.50 | 8.05 | 23.08 | 15.81 | 20.85 | 8.54 | 5.92 |
| 19 | 92.39 | 4.99 | 12.87 | 10.35 | 19.62 | 20.75 | 14.37 | 9.44 |

| EXAMPLE | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 18 | 57 | 47.76 | .89 | 89.5 | 84.1 |
| 19 | 53 | 77.29 | .91 | 97.0 | 92.6 |

EXAMPLE 20

A second sample of separator sheet was cut from Example 18 and its performance in a chlor-alkali cell and porosimeter were determined. Properties and performance data are shown in Table XXI.

TABLE XXI

| EX. | % PORES 0.12–33 μ | 0.12–.259 μ | 0.26–0.589 μ | 0.59–1.309 μ | 1.31–2.949 μ | 2.95–6.59 μ | 6.60–14.759 μ | 14.76–33 μ |
|---|---|---|---|---|---|---|---|---|
| 20 | 90.53 | 3.63 | 10.41 | 23.71 | 21.16 | 15.45 | 10.34 | 5.84 |

| EXAMPLE | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 20 | 57 | 74.74 | .85 | 89.5 | 84.6 |

EXAMPLE 21

A polytetrafluoroethylene separator was prepared using the same materials, mixing and milling as Example 2 above. Performance data and properties are provided in Table XXII.

EXAMPLE 22

A Teflon separator was prepared by mixing in a V-shaped blender for 3 minutes, 97.5 grams PTFE #6A powder with an equal amount of PTFE #7A powder and 696 grams of calcium carbonate which had been screened to particle sizes of greater than 74 microns but less than 104 microns. 195 mls Zonyl FSN fluorosurfactant was then added to the powder and blended for an additional 5 minutes. Milling was conducted on a mill manufactured by the Farrel Company which was a two-roll mill with 8 inch diameter rollers and 16 inch face. Milling was conducted at a speed of 5 ft/min at a roller ratio of 1:1. The actual milling procedure was identical to Example 2, except the second milling step of 0.043 inch gap was eliminated. Performance data for the separator of Example 22 is provided in Table XXIII.

TABLE XXIII

| | PORE DISTRIBUTION (%) | | | | | | | |
|---|---|---|---|---|---|---|---|---|
| EX. | % PORES 0.12–33 μ | 0.12–.259 μ | 0.26–0.589 μ | 0.59–1.309 μ | 1.31–2.949 μ | 2.95–6.59 μ | 6.60–14.759 μ | 14.76–33 μ |
| 22 | 90.74 | 8.80 | 8.94 | 18.33 | 16.95 | 20.83 | 10.51 | 6.37 |

| EXAMPLE | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 22 | 42 | 70.41 | .93 | 96.5 | 91.2 |

EXAMPLE 23

A Teflon microporous separator was prepared by blending for 2 minutes 247 grams of calcium carbonate screened at more than 53 microns but less than 61 microns, and 50 ml of kerosene and 10 mls of Zonyl FSN fluorosurfactant. Subsequently, 50 grams of PTFE powder #6 was added to the mixture and blended for an additional 5 minutes. Material was milled on the two roll mill of Examples 1–3 according to the procedure in Table XXIV.

TABLE XXIV

| | Gap Setting (inches) | Milling Procedure |
|---|---|---|
| (1) | .043 | allow material to wrap around rollers until single sheet is formed, remove sheet |
| (2) | .043 | fold parallel, mill |
| (3) | .074 | fold in thirds, reorient 90°, mill |
| (4) | .074 | fold parallel, mill |
| (5) | .074 | fold parallel, mill |
| (6) | .057 | thin |
| (7) | .043 | thin |
| (8) | .074 | fold in thirds, reorient 90°, mill |
| (9) | .074 | fold parallel, mill |
| (10) | .074 | fold parallel, mill |
| (11) | .057 | thin |
| (12) | .043 | thin |

The milled PTFE sheet was dried, sintered, leached and rinsed according to the method steps of Examples 1–3, followed by evaluation in the laboratory scale chlor-alkali cell and mercury porosimeter. Performance data and physical characteristics are provided in Table XXV.

TABLE XXV

| | PORE DISTRIBUTION (%) | | | | | | | |
|---|---|---|---|---|---|---|---|---|
| EX. | % PORES 0.12–33 μ | 0.12–.259 μ | 0.26–0.589 μ | 0.59–1.309 μ | 1.31–2.949 μ | 2.95–6.59 μ | 6.60–14.759 μ | 14.76–33 μ |
| 23 | 93.87 | 3.26 | 7.78 | 14.95 | 15.20 | 20.56 | 15.96 | 16.16 |

| EX. | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 23 | 50 | 80.74 | .77 | 72.5 | 81.1 |

The low calculated caustic current efficiency demonstrated for Example 23 is attributed to a diffuse pore distribution, i.e., too high a percentage of pores throughout the 0.59–14.759 micron range.

EXAMPLE 24

A second sample sheet was cut from the separator of Example 1 and its performance and physical properties determined. Table XXVI provides data on this second sampling.

TABLE XXVI

| | PORE DISTRIBUTION (%) | | | | | | | |
|---|---|---|---|---|---|---|---|---|
| EX. | % PORES 0.12–33 μ | 0.12–.259 μ | 0.26–0.589 μ | 0.59–1.309 μ | 1.31–2.949 μ | 2.95–6.59 μ | 6.60–14.759 μ | 14.76–33 μ |
| 24 | 92.50 | 15.55 | 9.95 | 22.69 | 15.46 | 14.10 | 11.21 | 3.53 |

| EX. | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 24 | 59 | 64.29 | .85 | 92.0 | 90.2 |

EXAMPLE 25

A Teflon microporous separator was prepared by blending for 1 minute 80 grams of polytetrafluoroethylene powder #6A with 217 grams of calcium carbonate screened at particle sizes of more than 104 microns but less than 150 microns. 65 mls of Zonyl FSN fluorosurfactant was then added to the powder mixture and blended for an additional 5 minutes. The material was milled on a two roll mill corresponding to Examples 1–3 by the procedures set forth in Table XXVII.

TABLE XXVII

| | Gap Setting (inches) | Milling Procedure |
|---|---|---|
| (1) | .043 | Load material, allow to wrap rolls and remove sheet |
| (2) | .043 | Fold sheet in thirds, reorient 90°, and mill |
| (3) | .043 | Fold sheet in thirds, reorient 90°, and mill |
| (4) | .057 | Fold sheet in thirds, reorient 90°, and mill |
| (5) | .074 | Fold sheet in thirds, reorient 90°, and mill |
| (6) | .074 | Fold sheet in thirds, reorient 90°, and mill |
| (7) | .108 | Fold sheet in half, reorient 90°, and mill |
| (8) | .091 | Thin |
| (9) | .074 | Thin |
| (10) | .057 | Thin |
| (11) | .043 | Thin |
| (12) | .027 | Thin |
| (13) | .013 | Thin |

The milled PTFE sheet was dried, sintered, leached and rinsed according to the method steps of Examples 1-3 followed by evaluation in the laboratory scale chloralkali cell and mercury porosimeter. Performance data and physical characteristics are shown in Table XXVIII.

TABLE XXVIII

| EX. | % PORES 0.12- 0.33 μ | PORE DISTRIBUTION (%) | | | | | | |
|---|---|---|---|---|---|---|---|---|
| | | 0.12-.259 μ | 0.26- 0.589 μ | 0.59- 1.309 μ | 1.31- 2.949 μ | 2.95- 6.59 μ | 6.60- 14.759 μ | 14.76- 33 μ |
| 25 | 91.97 | 2.14 | 11.33 | 8.41 | 20.85 | 20.58 | 21.17 | 7.51 |

| EX. | THICK-NESS mil | POR-OS-ITY % | HYS-TER-ESIS @ 1 psia | ACTUAL CURRENT EFFI-CIENCY @ 150 gpl NaOH | CALCU-LATED CURRENT EFFI-CIENCY @ 150 gpl NaOH |
|---|---|---|---|---|---|
| 25 | 27 | 73.62 | .72 | 88.0 | 96.0 |

EXAMPLE 26

A Teflon microporous separator was prepared by blending for 1 minute 80 grams of PTFE powder #6A with 217 grams calcium carbonate powder screened to a particle size of more than 104 microns but less than 150 microns. Subsequently, 80 mls Zonyl FSN fluorosurfactant was added and blended for 5 minutes. The material was milled on a two roll mill according to Examples 1-3 employing the procedures in Table XXIX.

TABLE XXIX

| | Gap Setting (inches) | Milling Procedures |
|---|---|---|
| (1) | .050 | Load material, allow to wrap and remove single sheet |
| (2) | .057 | Fold parallel and mill |
| (3) | .074 | Fold parallel and mill |
| (4) | .057 | Thin |
| (5) | .050 | Thin |
| (6) | .074 | Fold parallel and mill |
| (7) | .108 | Fold parallel and mill |
| (8) | .091 | Thin |
| (9) | .074 | Thin |
| (10) | .057 | Thin |
| (11) | .050 | Thin |
| (12) | .074 | Fold parallel and mill |
| (13) | .057 | Thin |
| (14) | .050 | Thin |
| (15) | .074 | Fold parallel and mill |
| (16) | .057 | Thin |
| (17) | .050 | Thin |

The milled PTFE sheet was dried, sintered, leached and rinsed according to a method steps of Examples 1-3 followed by evaluation in the laboratory scale chloralkali cell and mercury porosimeter. Performance data and physical characteristics are disclosed in Table XXX.

TABLE XXX

| EX. | % PORES 0.12- 0.33 μ | PORE DISTRIBUTION (%) | | | | | | |
|---|---|---|---|---|---|---|---|---|
| | | 0.12-.259 μ | 0.26- 0.589 μ | 0.59- 1.309 μ | 1.31- 2.949 μ | 2.95- 6.59 μ | 6.60- 14.759 μ | 14.76- 33 μ |
| 26 | 93.07 | 7.10 | 7.15 | 11.33 | 24.75 | 25.63 | 10.07 | 7.04 |

TABLE XXX-continued

| EX. | THICK-NESS mil | POR-OS-ITY % | HYS-TER-ESIS @ 1 psia | ACTUAL CURRENT EFFI-CIENCY @ 150 gpl NaOH | CALCULATED CURRENT EFFI-CIENCY @ 150 gpl NaOH |
|---|---|---|---|---|---|
| 26 | 72 | 68.84 | .76 | 90.0 | 88.9 |

EXAMPLE 27

A polytetrafluoroethylene separator was prepared according to Example 2, except the specific milling procedures outlined in Table XXXI were used.

TABLE XXXI

| | Gap Setting (inches) | Milling Procedure |
|---|---|---|
| (1) | .043 | Load material, allow to wrap rolls and remove single sheet |
| (2) | .057 | Fold parallel and mill |
| (3) | .074 | Fold sheet into thirds, reorient @ 90°, and mill |
| (4) | .074 | Fold parallel and mill |
| (5) | .057 | Thin |
| (6) | .043 | Thin |
| (7) | .074 | Fold in thirds, reorient @ 90°, and mill |
| (8) | .108 | Fold parallel and mill |
| (9) | .091 | Thin |
| (10) | .074 | Thin |
| (11) | .057 | Thin |
| (12) | .043 | Thin |
| (13) | .091 | Fold in thirds, reorient @ 90°, and mill |
| (14) | .074 | Thin |
| (15) | .057 | Thin |
| (16) | .043 | Thin |

Performance data and physical characteristics are provided in Table XXXII.

TABLE XXXII

| EX. | % PORES 0.12- 33 μ | PORE DISTRIBUTION (%) | | | | | | |
|---|---|---|---|---|---|---|---|---|
| | | 0.12-.259 μ | 0.26- 0.589 μ | 0.59- 1.309 μ | 1.31- 2.949 μ | 2.95- 6.59 μ | 6.60- 14.759 μ | 14.76- 33 μ |
| 27 | 88.52 | 7.72 | 11.18 | 20.12 | 19.41 | 14.33 | 9.96 | 5.79 |

| EX. | THICK-NESS mil | POR-OS-ITY % | HYS-TER-ESIS @ 1 psia | ACTUAL CURRENT EFFI-CIENCY @ 150 gpl NaOH | CALCU-LATED CURRENT EFFI-CIENCY @ gpl NaOH |
|---|---|---|---|---|---|
| 27 | 52 | 69.41 | .92 | 86.0 | 93.3 |

EXAMPLE 28

A microporous separator was prepared by blending for 1 minute 80 grams of PTFE powder #6A with 217 grams calcium carbonate powder screened to a particle size of more than 43 microns but under 53 microns. 80 mls Zonyl FSN was subsequently added to the powder mixture and blended for an additional 5 minutes. The material was milled on a two roll mill corresponding to that of Example 1-3 according to the following procedure. The mill was set at a gap of 0.050 inches, the material was loaded and allowed to wrap around the mill rolls and removed as a single sheet. The milled PTFE sheet was dried, sintered, leached and rinsed according to the procedures of Examples 1-3 followed by evaluation in the laboratory scale chlor-alkali cell and mercury porosimeter. Performance data and physical characteristics are provided in Table XXXIII.

TABLE XXXIII

| | | PORE DISTRIBUTION (%) | | | | | | |
|---|---|---|---|---|---|---|---|---|
| EX. | % PORES 0.12– 33 $\mu$ | 0.12– .259 $\mu$ | 0.26– 0.589 $\mu$ | 0.59– 1.309 $\mu$ | 1.31– 2.949 $\mu$ | 2.95– 6.59 $\mu$ | 6.60– 14.759 $\mu$ | 14.76– 33 $\mu$ |
| 28 | 90.07 | 3.25 | 4.22 | 8.79 | 18.72 | 36.73 | 11.86 | 6.50 |

| EX. | THICKNESS mil | POROSITY % | HYSTERESIS @ 1 psia | ACTUAL CURRENT EFFICIENCY @ 150 gpl NaOH | CALCULATED CURRENT EFFICIENCY @ 150 gpl NaOH |
|---|---|---|---|---|---|
| 28 | 45 | 67.10 | .58 | 92.5 | 87.0 |

The diaphragm of this invention has been described with reference to a chlor-alkali cell and the properties of the diaphragm have been related to the performance of the diaphragm in such a cell. However, it will be appreciated by those skilled in the art that a diaphragm having the physical properties described herein will be suitable for use in various electrolytic processes and devices including use in fuel cells, hydrogen oxygen cells and the like.

Moreover, although the above examples disclose the use of the diaphragm of this invention to produce sodium hydroxide at 150 gpl and at high current efficiencies, the diaphragms disclosed herein may also be adpated to product sodium hydroxide at concentrations greater or less than 150 gpl and at current efficiencies less than 85%. As will be appreciated by those skilled in the art, the current efficiency will decrease for a given separator as the sodium hydroxide concentration is increased and the current efficiency will increase as the sodium hydroxide concentration is decreased. The efficiency of the separators of this invention have been exemplified with reference to a 150 grams per liter sodium hydroxide concentration level since a commercially desirable separator possesses a current efficiency of 85% or higher at 150 grams per liter sodium hydroxide concentration.

Although the permissable distribution of pores within zones is defined with reference to current efficiency by the formula:

$$CE = A + Bx + Cx_1 + Dx_2 + Ex_3 + Fx_4 + Gx_6$$

preferred separators have at least 10% of the pores distributed within zone D and at least 10% within zone E, and preferably 5% within zone C, while most preferably 10% of the pores are distributed within zone C. Separators are also preferred wherein the combined distribution within zones C and D is at least 20%. Moreover, for all distributions within zones C-F, preferred separators have less than 20% of the pores distributed within zone G.

While the invention has been described in conjunction with specific examples thereof, these are illustrative only. Accordingly, many alternatives, modifications, and variations will be apparent to those skilled in the art in view of the foregoing description and it is therefore intended to embrace all such alternatives, modifications and variations as to fall within the spirit and broad scope of the appended claims.

We claim:

1. A polymeric microporous electrolytic cell separator having:
   a. porosity of at least about 60%;
   b. thickness of between 8 and 130 mils;
   c. hysteresis of from 0.30 to 0.99 wherein hysteresis is defined as the ratio of the amount of mercury trapped within the pore structure of the separator after release of pressure to 1 psi compared to the amount of mercury present when first subjected to total impregnation by mercury at 50,000 psi, and
   d. distribution of pore sizes in a range between 0.004 and 34 microns wherein at least 85% of said pores have a diameter of between 0.12 and 33 microns and at least 60% of said pores have a diameter between 0.59 and 33 microns;

wherein said porosity, thickness, hysteresis, and pore size distribution are adapted to provide said separator with the porperty of exhibiting a high current efficiency including the property of a current efficiency of about 85% to about 98% when measured in a chlor-alkali cell at a sodium hydroxide concentration of 150 gpl, and said separator having hydraulic properties adapted for use in a commercial scale cell.

2. The cell separator of claim 1 wherein said porosity, thickness, hysteresis and distribution of pore diameters are related to said current efficiency by the following formula:

$$CE = A + Bx + Cx_1 + Dx_2 + Ex_3 + Fx_4 + Gx_5 + Jx_6 + Kx_7$$

wherein:
   $A = \text{Constant} = +116.4$
   $Bx = -11.07 \, [(\text{Porosity}) (\text{hysteresis}) \div (\text{thickness})]$
   $Cx_1 = +1.495 \, (\text{Zone D} + \text{Zone F})$
   $Dx_2 = -0.9290 \, (\text{Zone F} + \text{Zone G})$
   $Ex_3 = -1.153 \, (\text{Zone E} + \text{Zone F})$
   $Fx_4 = -1.484 \, (\text{Zone C} + \text{Zone D})$
   $Gx_5 = +92.37 \, (\text{hysteresis})$
   $Jx_6 = -1.756 \, (\text{thickness}) (\text{hysteresis})$
   $Kx_7 = +0.9026 \, (\text{thickness})$
      wherein Zones C–G represent percentages of pores having diameter ranges:
      Zone C = 0.59 to 1.309 microns
      Zone D = 1.31 to 2.949 microns
      Zone E = 2.95 to 6.59 microns
      Zone F = 6.60 to 14.759 microns
      Zone G = 14.76 to 33 microns.

3. The cell separator of claim 2 wherein the polymeric material is fluorine-containing 4. The cell separator of claim 3 wherein the fluorine-containing polymeric material is polytetrafluoroethylene.

5. The cell separator of claim 4 wherein the porosity is at least 70%.

6. The cell separator of claim 4 wherein the thickness is from about 20 to about 70 mils.

7. The cell separator of claim 4 wherein the hysteresis is from about 0.60 to 0.99.

8. The cell separator of claim 4 wherein said porosity is at least about 70% said thickness is from about 20 to about 70 mils, and said hysteresis is from about 0.60 to about 0.99.

9. The cell separator of claim 4, wherein at least about 10% of the pores are between 1.3 to 2.95 microns and about 10% of the pores are between 2.95 to 6.6 microns.

UNITED STATES PATENT OFFICE
CERTIFICATE OF CORRECTION

Patent No. 4,250,002　　　　　　　　Dated February 10, 1981

Inventor(s) Christine A. Lazarz, Edward H. Cook, Jr. and Arthur C. Schulz

It is certified that error appears in the above-identified patent and that said Letters Patent are hereby corrected as shown below:

Column 4, line 49, the formula should appear as follows:

$$CE=A+B_x+C_{x1}+D_{x2}+E_{x3}+F_{x4}+G_{x5}+J_{x6}+K_{x7}$$

Column 8, line 47 "Zone C" should read -- Zone D --

Column 8, line 53 "Zone D" should read -- Zone E --

Column 35, line 50, the formula should read as follows:

$$CE=A+B_x+C_{x1}+D_{x2}+E_{x3}+F_{x4}+G_{x5}+J_{x6}+K_{x7}$$

Column 35, line 58 "zones C-F" should read -- zones C-G --

Claim 9, line 67 "1.3" should read -- 1.31 --

Claim 18, line 28, "claim 14" should read -- claim 17 --

Claim 22, line 46 "claim 18" should read -- claim 21 --

UNITED STATES PATENT OFFICE
CERTIFICATE OF CORRECTION

Patent No. 4,250,002     Dated February 10, 1981

Inventor(s) Christine A. Lazarz, Edward H. Cook, Jr. and Arthur C. Schulz

It is certified that error appears in the above-identified patent and that said Letters Patent are hereby corrected as shown below:

Column 4, line 49, the formula should appear as follows:

$$CE = A + B_x + C_{x1} + D_{x2} + E_{x3} + F_{x4} + G_{x5} + J_{x6} + K_{x7}$$

Column 8, line 47 "Zone C" should read -- Zone D --

Column 8, line 53 "Zone D" should read -- Zone E --

Column 35, line 50, the formula should read as follows:

$$CE = A + B_x + C_{x1} + D_{x2} + E_{x3} + F_{x4} + G_{x5} + J_{x6} + K_{x7}$$

Column 35, line 58 "zones C-F" should read -- zones C-G --

Claim 9, line 67 "1.3" should read -- 1.31 --

Claim 18, line 28, "claim 14" should read -- claim 17 --

Claim 22, line 46 "claim 18" should read -- claim 21 --

UNITED STATES PATENT OFFICE
CERTIFICATE OF CORRECTION

Patent No. 4,250,002   Dated February 10, 1981

Inventor(s) Christine A. Lazarz, Edward H. Cook, Jr. and Arthur C. Schulz

It is certified that error appears in the above-identified patent and that said Letters Patent are hereby corrected as shown below:

Claim 24, column 38, line 14 "-9.9290" should read

. . .-0.9290 . . .

Claim 25, line 61 "Zone 6" should read - - Zone G - -

Claim 27, line 17 "8 and 30 mils" should read

- - 8 and 130 mils - -

Claim 32, line 42 "FIG. III" should read - - FIG IV - -

Claim 32, lines 44 and 45 "FIG IV" should read

- - FIG III - -

Signed and Sealed this

Tenth Day of November 1981

[SEAL]

Attest:

GERALD J. MOSSINGHOFF

Attesting Officer   Commissioner of Patents and Trademarks